(12) United States Patent
Takayama et al.

(10) Patent No.: US 8,377,549 B2
(45) Date of Patent: Feb. 19, 2013

(54) DEVELOPER CARRYING MEMBER, AND DEVELOPING APPARATUS USING SAME

(75) Inventors: Yoshiyuki Takayama, Tokyo (JP); Masayoshi Shimamura, Yokohama (JP); Yasutaka Akashi, Yokohama (JP); Satoshi Otake, Numazu (JP); Takuma Matsuda, Suntou-gun (JP); Minoru Ito, Susono (JP); Kazuhito Wakabayashi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/182,753

(22) Filed: Jul. 14, 2011

(65) Prior Publication Data

US 2011/0274467 A1 Nov. 10, 2011

Related U.S. Application Data

(63) Continuation of application No. PCT/JP2011/002153, filed on Apr. 12, 2011.

(30) Foreign Application Priority Data

Apr. 23, 2010 (JP) ................................. 2010-099887

(51) Int. Cl.
*B32B 5/16* (2006.01)
*G03G 15/06* (2006.01)
*G03G 15/08* (2006.01)

(52) U.S. Cl. .......................... 428/323; 399/222; 399/252

(58) Field of Classification Search ........................ None
See application file for complete search history.

(56) References Cited

U.S. PATENT DOCUMENTS

| 7,264,911 | B2 * | 9/2007 | Matsumura et al. | ............. 399/38 |
| 8,298,658 | B2 * | 10/2012 | Shimamura et al. | ........... 428/323 |
| 2007/0036968 | A1 * | 2/2007 | Shimamura et al. | ........... 428/323 |

FOREIGN PATENT DOCUMENTS

| JP | 8-30088 | A | 2/1996 |
| JP | 2001-312136 | A | 11/2001 |
| JP | 2006-84726 | A | 3/2006 |
| JP | 2006-119538 | A | 5/2006 |
| JP | 2007-25593 | A | 2/2007 |
| JP | 2007-147734 | A | 6/2007 |
| JP | 2007-206647 | A | 8/2007 |
| JP | 2008-281697 | A | 11/2008 |

OTHER PUBLICATIONS

PCT International Search Report and Written Opinion of the International Searching Authority, International Application No. PCT/JP2011/002153, Mailing Date May 24, 2011.
International Preliminary Report on Patentability, International Application No. PCT/JP2011/002153, Mailing Date Nov. 1, 2012.

* cited by examiner

*Primary Examiner* — Sheeba Ahmed
(74) *Attorney, Agent, or Firm* — Fitzpatrick, Cella, Harper & Scinto

(57) ABSTRACT

The present invention relates to a developer carrying member which includes a substrate and the resin layer formed on the surface of the substrate, wherein the resin layer is obtained by thermally curing the coating material composition including at least the following (A) to (E): (A) a thermosetting resin as a binder resin; (B) an alcohol as a solvent, containing 1 to 4 carbon atoms; (C) a resin including the unit represented by the following formula (1); (D) graphitized carbon black having a graphite (002) lattice spacing of 0.3370 nm or more and 0.3450 nm or less as measured by X-ray diffraction; and (E) acid carbon black having a pH of 5.0 or less:

$$\left( CH_2 - \underset{\underset{X-R_2-\underset{R_5}{\overset{R_3}{\underset{|}{N^+}}}-R_4}{|}}{\overset{R_1}{\underset{|}{C}}} \right) \quad A^- \tag{1}$$

3 Claims, 5 Drawing Sheets

DEVELOPER CARRYING MEMBER, AND DEVELOPING APPARATUS USING SAME

CROSS-REFERENCE TO RELATED APPLICATIONS

This application is a continuation of International Application No. PCT/JP2011/002153, filed Apr. 12, 2011, which claims the benefit of Japanese Patent Application No. 2010-099887, filed Apr. 23, 2010.

BACKGROUND OF THE INVENTION

1. Field of the Invention

The present invention relates to a developer carrying member and a developing apparatus used for an image forming apparatus.

2. Description of the Related Art

The triboelectric charge amount of the toner is susceptible to the surface condition of the developer carrying member. In Japanese Patent Application Laid-Open No. H08-030088, the triboelectric charge amount distribution is controlled by providing a charge controlling agent-containing resin layer on the surface of the developer carrying member. Japanese Patent Application Laid-Open No. 2001-312136 has proposed a developer carrying member including in the resin layer thereof as a charge controlling agent a quaternary ammonium base-containing copolymer. According to this constitution, by the ionization of the negatively charged counterion of the quaternary ammonium base, the charge controlling agent is made to be ion conductive, and accordingly the volume resistance of the resin layer is decreased to some extent. Accordingly, the image failure such as ghost or fog is improved. Japanese Patent Application Laid-Open No. 2007-025593 has proposed a developer carrying member including in the resin layer thereof a positively chargeable resin and a specific carbon black. According to such a constitution, by using a carbon black being small in particle size and having lubricity, a uniform and high triboelectric charge can be imparted to the toner. The contamination of the surface of the developer carrying member due to the fusion bonding of the toner or the toner attachment can also be suppressed.

SUMMARY OF THE INVENTION

Recently, in order to meet the demands for high image quality of electrophotographic images, spherized and small-particle-sized toners have been predominating. In general, for the purpose of realizing high image quality, the triboelectric charge amount of the toner is required to be more uniformly controlled by the developer carrying member so as to develop electrostatic latent images with higher fidelity. In this respect, however, the present inventors have acquired a recognition that, the developer carrying members of the above-described Japanese Patent Application Laid-Open No. H08-030088, Japanese Patent Application Laid-Open No. 2001-312136, and Japanese Patent Application Laid-Open No. 2007-025593 have still left room for improvement with respect to such small-particle-sized and spherized toners. Specifically, the present inventors have recognized that it is necessary to provide a developer carrying member which has at the same time in a higher level the capability of imparting stable triboelectric charges to the spherized and small-particle-sized toners, the durability in the sense that such capability is hardly degraded even by long-term use and the resistance to the contamination of the toners.

Accordingly, the present invention is directed to provide a developer carrying member, even by long-term use, capable of imparting to the toner a uniform triboelectric charge amount distribution while rapidly imparting to the toner a sufficiently high triboelectric chargeability, and also excellent in the contamination resistance, and to provide a developing apparatus using the developer carrying member.

According to one aspect of the present invention, there is provided a developer carrying member comprising a substrate and the resin layer formed thereon, wherein the resin layer is obtained by thermally curing the coating material composition including the following (A) to (E):

(A) a thermosetting resin as a binder resin
(B) an alcohol having 1 to 4 carbon atoms as a solvent,
(C) a resin having the unit represented by the following formula (1)
(D) a graphitized carbon black having a graphite (002) lattice spacing of 0.3370 nm or more and 0.3450 nm or less as measured by X-ray diffraction
(E) an acidic carbon black having a pH of 5.0 or less

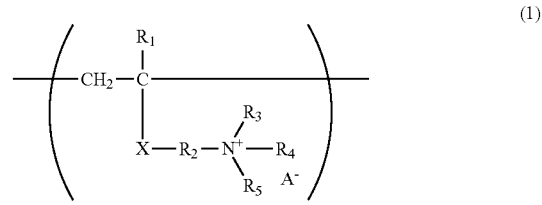

wherein, in the formula (1), $R_1$ represents a hydrogen atom or a methyl group; $R_2$ represents an alkylene group having 1 to 4 carbon atoms; one or two or more groups selected from the group consisting of $R_3$, $R_4$ and $R_5$ each represents an alkyl group having 4 to 18 carbon atoms, and each of the rest represents an alkyl group having 1 to 3 carbon atoms; X represents —COO—, —CONH— or —$C_6H_4$—; and $A^-$ represents an anion.

The developing apparatus according to the present invention includes a developer including toner particles, a vessel housing the developer and a developer carrying member for carrying and conveying the developer housed in the vessel, wherein the developer carrying member is the above-described developer carrying member.

According to the present invention, it is possible to obtain a developer carrying member, even by long-term use, capable of imparting to the toner a uniform triboelectric charge amount distribution while rapidly imparting to the toner a sufficiently high triboelectric chargeability, and also excellent in the contamination resistance, and also provided is a developing apparatus contributing to stable formation of high quality electrophotographic images.

DESCRIPTION OF THE EMBODIMENTS

Figure 1:
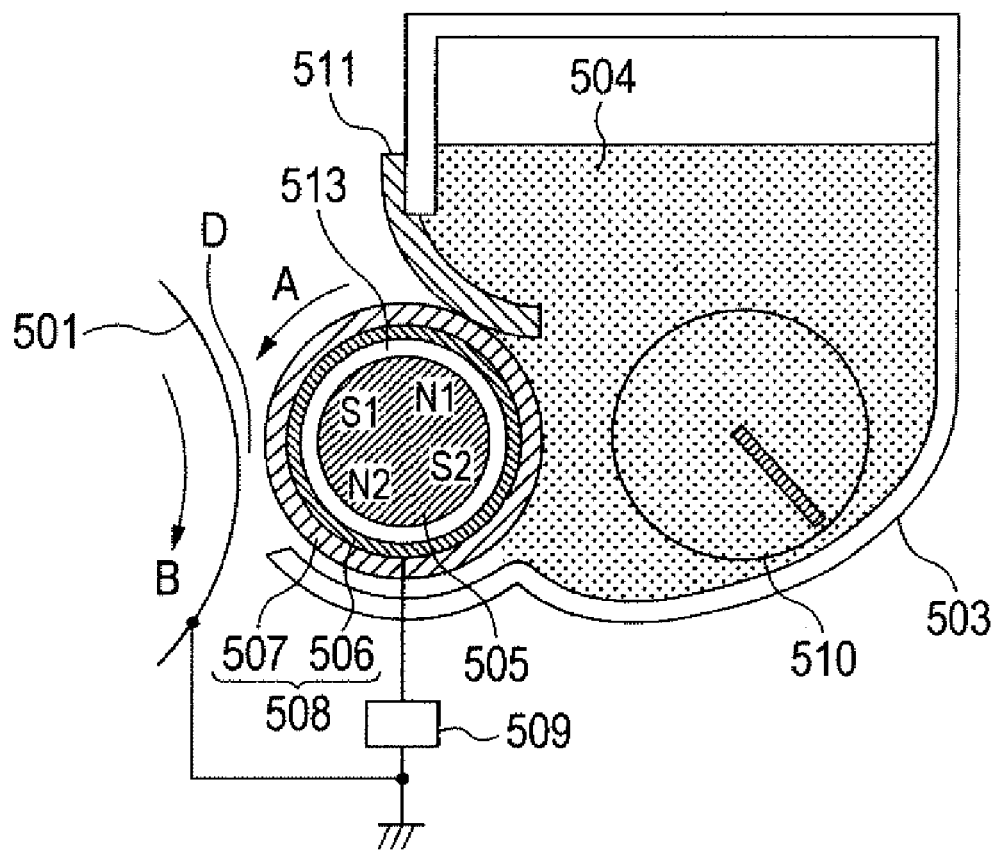
FIG. 1 is a sectional view illustrating an example of the developing apparatus according to the present invention.

Hereinafter, the present invention is described with reference to preferred embodiments.

The developer carrying member according to the present invention includes a substrate and the resin layer formed on the surface of the substrate. The resin layer is obtained by thermally curing the coating material composition including the following (A) to (E):

(A) a thermosetting resin as a binder resin
(B) an alcohol as a solvent, containing 1 to 4 carbon atoms
(C) a resin including the unit represented by the following formula (1)
(D) graphitized carbon black having a graphite (002) lattice spacing of 0.3370 nm or more and 0.3450 nm or less as measured by X-ray diffraction
(E) acid carbon black having a pH of 5.0 or less

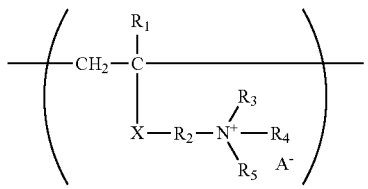

(1)

wherein, in formula (1), $R_1$ represents a hydrogen atom or a methyl group; $R_2$ represents an alkylene group having 1 to 4 carbon atoms; one or two or more groups selected from the group consisting of $R_3$, $R_4$ and $R_5$ each represent an alkyl group having 4 to 18 carbon atoms, and each of the rest represents an alkyl group having 1 to 3 carbon atoms; X represents —COO—, —CONH— or —$C_6H_4$—; and $A^-$ represents an anion.

<Component (A)>

The resin layer formed on the surface of the substrate of the developer carrying member of the present invention includes a thermosetting resin as a binder resin. The use of the thermosetting resin as a binder resin improves the durability and the environmental stability of the resin layer. As the thermosetting resin, particularly from the viewpoint of toughness and durability, phenolic resin, melamine resin, urea resin and benzoguanamine resin are preferable. Among these, phenolic resin is more preferable, because phenolic resin improves the abrasion resistance of the resin layer, is excellent in the environmental stability, and is excellent in the compatibility with the below-described component (C). Among these thermosetting resins, the thermosetting resins soluble, in particular, in lower alcohols such as methanol, ethanol, propyl alcohol and butanol are preferable, because such resins are particularly satisfactory in the compatibility with the component (C).

<Component (C)>

The resin layer formed on the surface of the substrate of the developer carrying member of the present invention includes a resin that includes at least the unit represented by formula (1). The inclusion of the resin including the unit represented by formula (1) can improve the triboelectric charge imparting capability of the resin layer to the toner. The unit represented by formula (1) has ionic conductivity, and hence the electroconductivity of the resin layer is improved as compared to conventional charge controlling agents, and the excessive triboelectric charging to the toner can be suppressed.

Among the resins represented by formula (1), the resins that have the structures satisfying the following requirements (a) to (d) are particularly preferably used:

(a) $R_1$ is a methyl group, and $R_2$ is a methylene group or an ethylene group;
(b) one or two or more selected from the group consisting of $R_3$, $R_4$ and $R_5$ are each any one selected from the group consisting of an octyl group, a nonyl group, a decyl group, an undecyl group, a dodecyl group, a tridecyl group and a tetradecyl group;
(c) the group or the groups of $R_3$, $R_4$ and $R_5$ being different from an octyl group, a nonyl group, a decyl group, an undecyl group, a dodecyl group, a tridecyl group and a tetradecyl group is or are each any one selected from the group consisting of a methyl group, an ethyl group and a propyl group; and
(d) $A^-$ is an anion containing a sulfur atom or a halogen atom.

By introducing the long-chain alkyl group having 4 to 18 carbon atoms into one or two or more selected from the group consisting of $R_3$, $R_4$ and $R_5$ in formula (1), the unit being the charging site is made to be present uniformly in the binder resin. Consequently, it is possible to obtain a developer carrying member capable of imparting a uniform triboelectric charge to the toner. In particular, preferable is a unit in which $R_3$ is an octyl group, a nonyl group, a decyl group, an undecyl group, a dodecyl group, a tridecyl group and a tetradecyl group, and $R_4$ and $R_5$ are each independently a methyl group, an ethyl group or a propyl group. This is because a developer carrying member capable of imparting a more uniform triboelectric charge is obtained. Due to the presence of the long-chain alkyl group within the unit, the unit exhibits a tendency that the unit is more abundantly present on the surface side of the resin layer than on the substrate side. The unit represented by formula (1) is cationic in nature, consequently the cationic unit is increased in proportion on the surface side of the resin layer, and thus a developer carrying member more improved in negative charge imparting capability to the toner is obtained.

The $A^-$ is a halide anion; the anion of an inorganic acid such as hydrochloric acid, hydrobromic acid, sulfuric acid, phosphoric acid or nitric acid; or the anion of an organic acid such as a carboxylic acid or a sulfonic acid. The $A^-$ is preferably an anion containing a sulfur atom or a halogen atom, and is preferably a halide ion such as Br— and Cl— because of the satisfactory compatibility with the thermosetting resin.

The resin as the component (C) can be produced by polymerizing a monomer having a quaternary ammonium base. Examples of the monomer having a quaternary ammonium base include the monomers each being the unit represented by the following formula (2):

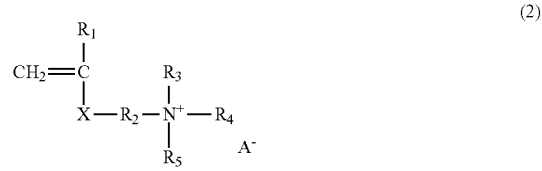

(2)

wherein the definitions of the $R_1$ to $R_5$, X and $A^-$ in formula (2) are the same as in formula (1).

For the production of the resin usable as the component (C), heretofore known polymerization methods can be used. Examples of such methods include a bulk polymerization method, a solution polymerization method, an emulsion polymerization method and a suspension polymerization method; preferable of these is a solution polymerization method because of the easiness in controlling the reaction. The solvents to be used in the solution polymerization method are the lower alcohols such as methanol, ethanol, n-butanol and isopropyl alcohol. Additionally, where necessary, solvents such as xylene, toluene, ethyl acetate, isobutyl acetate, methyl ethyl ketone, methyl isobutyl ketone, N,N-dimethylformamide and dimethylformamide may be used as mixed in the solvent; however, it is preferable to mainly use as the solvent lower alcohols for the purpose of improving the compatibility with the thermosetting binder resin used in the present invention. The ratio between the solvent and the monomer component is preferably such that the polymerization is performed with 30 parts by mass or more and 400 parts by mass or less of the monomer component in relation to 100 parts by mass of the solvent, from the viewpoint of the reaction rate of the monomer.

The polymerization of the monomer can be performed, for example, by heating the monomer in the presence of the polymerization initiator in an inert gas atmosphere at a temperature of 50° C. or higher and 100° C. or lower. Examples of the polymerization initiator used for polymerization include the following: t-butylperoxy-2-ethyl hexanoate, cumyl perpivalate, t-butylperoxy laurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and dimethyl 2,2'-azobis(2-methylpropionate). The polymerization initiators can be used each alone or two or more of monomers may be used in combination. Usually the polymerization is started by adding the polymerization initiator to a monomer solution; however, for the purpose of reducing the amount of the unreacted monomer(s), part of the polymerization initiator may be added in the midway of the polymerization. Methods for promoting polymerization with irradiation of ultraviolet light or electron beam can also be used, and such methods may also be combined.

The used amount of the polymerization initiator is preferably set at 0.05 part by mass or more and 30 parts by mass or less and more preferably 0.1 part by mass or more and 15 parts by mass or less in relation to 100 parts by mass of the monomer component from the viewpoint of reducing the amount of the unreacted monomer(s) and making appropriate the reaction rate. The temperature of the polymerization reaction can be set according to the solvent to be used, the polymerization initiator to be used and the composition of the monomer component to be used; however, the polymerization is preferably performed at a temperature of 40° C. or higher and 150° C. or lower, for the purpose of making appropriate the polymerization reaction rate and preventing the volatilization of the solvent.

As the monomer which is the unit represented by formula (2), the monomer produced by quaternarizing with a quaternarizing agent the monomer which is the unit represented by the following formula (3) can be used.

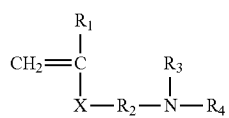

(3)

wherein the definitions of the $R_1$ to $R_4$, and X in formula (3) are the same as in formula (1).

Specific examples of the quaternarizing agent includes the following: alkyl halides such as butyl bromide, 2-ethylhexyl bromide, octyl bromide, lauryl bromide, stearyl bromide, butyl chloride, 2-ethylhexyl chloride, octyl chloride, lauryl chloride and stearyl chloride; and organic acid compounds such as methyl p-toluenesulfonate, dimethyl sulfate and methyl hydroxynaphthalenesulfonate.

The used amount of the quaternarizing agent is preferably 0.8 mole or more and 1.0 mole or less in relation to 1 mole of the monomer which is the unit represented by formula (3). This is because the unreacted quaternarizing agent can be made to vanish and a large proportion of the monomer can be quaternarized. Such quaternarization of a monomer can be performed, for example, by heating the monomer and the quaternarizing agent in a solvent at a temperature of 60° C. or higher and 90° C. or lower.

It is also possible to obtain the intended quaternary ammonium base-containing polymer by polymerizing the monomer which is the unit represented by formula (3) and then further quaternarizing the resulting polymer with the quaternarizing agent. Alternatively, for example, the monomer which is the unit represented by formula (3) is quaternarized with alkyl halide such as methyl chloride and then polymerized. The obtained quaternary ammonium base-containing polymer is treated for counterion exchange with an acid such as p-toulenesulfonic acid or hydroxynaphthalenesulfonic acid, and thus can also be converted into a quaternary ammonium base-containing polymer in which the anion is converted into an intended anion species.

The resin as the component (C) may include one or a plurality of types of other units, in addition to the unit represented by formula (1). The content of the other unit(s) included in the resin is preferably 50 mol % or less of the total number of moles of the units constituting the resin. The content of the other unit(s) set at 50 mol % or less facilitates the realization of the effect due to the introduction of the unit represented by formula (1). The mixing amount of the component (C) is preferably 1 part by mass or more and 40 parts by mass or less in relation to 100 parts by mass of the binder resin. By setting the mixing amount of the component (C) so as to fall within such a range, the control effect of the triboelectric charge due to the addition of the component (C) to the thermosetting resin can be displayed, and the component (C) can be present uniformly in the binder resin, and hence a uniform triboelectric charge amount distribution of the toner is obtained.

Specific examples of the resin which includes the unit represented by formula (1) and the other unit may include a resin which includes the unit represented by formula (1) and the unit represented by the following formula (4):

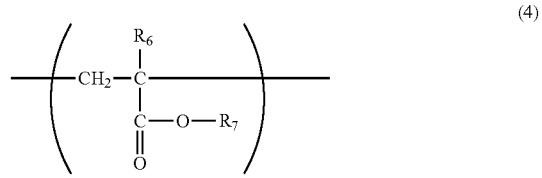

(4)

wherein, in formula (4), $R_6$ represents a hydrogen atom or a methyl group, and $R_7$ represents an alkyl group having 8 to 18 carbon atoms.

A more preferable form as the unit represented by formula (4) is such that $R_6$ is a methyl group and $R_7$ is a long-chain group selected from the group consisting of a decyl group, an undecyl group, a dodecyl group, a tridecyl group and a tetradecyl group. When the alkyl group is such a long-chain group as described above, the compatibility of the component (C) with the component (A) is increased. Accordingly, the component (C) is uniformly present in the binder resin, and it is possible to impart a uniform triboelectric charge to the toner. The improvement of the dispersibility of the pigments such as electroconductive particles in the resin is also facilitated, and hence the resistance distribution is also uniform and the local charge-up of the toner is suppressed.

By designing $R_7$ so as to be an alkyl group having 8 to 18 carbon atoms, the hydrophobicity can be relatively increased, and hence the compatibility of the component (C) with the binder resin is maintained. Consequently, it is possible to allow the component (C) to be present more uniformly in the resin layer. When the toner is brought into contact with the resin layer having a nonuniform distribution of the component (C), the triboelectric charge is varied depending on whether the component (C) is present or absent, and hence the distribution of the triboelectric charge amount of the toner tends to be nonuniform.

On the other hand, by designing $R_7$ so as to be a long-chain alkyl group having 18 or less carbon atoms, it is possible to suppress the decrease of the compatibility of the component (C) with the binder resin or the solvent due to the increase of the crystallinity of the component (C). When the crystallinity of the component (C) is too high, the component (C) tends to undergo the phase separation from the binder resin, and hence the distribution of the component (C) in the binder resin tends to be nonuniform. The toner brought into contact with such a resin layer tends to have a nonuniform distribution of the triboelectric charge amount.

The resin layer including an ion-conductive resin involved in the component (C) is required to have electroconductivity for the purpose of making the excessive charge flow into the resin layer when the charge is imparted excessively to the toner. For that purpose, it is necessary to make the resin layer contain electroconductive particles. In this connection, when the electroconductive particles are contained in the resin layer together with the component (C), the essential point is to avoid the aggregation of the electroconductive particles in the resin layer. The nonuniform distribution of the aggregates of the electroconductive particles in the resin layer impedes the smooth flow of the excessive charge of the excessively charged toner into the resin layer, and accordingly the image failure such as ghost or blotches due to the excessively charged toner occurs in the electrophotographic images, as the case may be. In other words, for the purpose of enabling the resin layer to uniformly impart high triboelectric charge to the toner, the surface lubricity of the resin layer is required to be improved, and a conductive agent is required to be uniformly distributed in the resin layer.

<Components (D) and (E)>

The present inventors have discovered that the above-described problems can be solved by using as conductive agents graphitized carbon black and acid carbon black in combination. Specifically, graphitized carbon black undergoes the removal of functional groups in the process of graphitization and is electrically neutral. Consequently, mutual aggregation of graphitized carbon black particles tends to occur. However, when graphitized carbon black is dispersed together with acid carbon black at the time of the preparation of the coating material for use in formation of the resin layer, the aggregates of graphitized carbon black are gradually disintegrated, and thus a coating material in which graphitized carbon black is uniformly dispersed can be obtained. By using such a coating material, a developer carrying member provided with a rein layer in which graphitized carbon black is uniformly dispersed can be obtained. The following explanation may be offered as the reasons for the fact that when graphitized carbon black is dispersed together with acid carbon black at the time of the preparation of the coating material for use in formation of the resin layer, a coating material in which graphitized carbon black is uniformly dispersed is obtained. As is well known, in general, the particles of an acid carbon black having a pH of 5.0 or less undergo repulsive force therebetween, and the dispersibility of such an acid carbon black in an alcohol resin solution is extremely satisfactory. In other words, such an acid carbon black is uniformly dispersed in the coating material. Acid carbon black relatively tends to be negatively charged. On the other hand, graphitized carbon black gradually exhibits positive chargeability by being brought into contact with acid carbon black. Consequently, graphitized carbon black is electrically attracted to uniformly distributed acid carbon black and thus the aggregates of graphitized carbon black probably come to be disintegrated.

The resin layer formed by using such a coating material is such that graphitized carbon black and acid carbon black excellent in lubricity and triboelectric charge imparting property are uniformly present on the surface of the developer carrying member. Accordingly, the occurrence of excessively charged toner and the attachment of the toner to the surface of the developer carrying member can be suppressed. Consequently, satisfactory image densities can be obtained without occurrence of image failures such as ghost and blotches.

The graphitized carbon black of the component (D) has a graphite (002) lattice spacing of 0.3370 nm to 0.3450 nm obtained by X-ray diffraction. As is known, the (002) lattice spacing of graphite in which hexagonal network planes of carbon atoms are regularly laminated and the perfect graphite structure is maintained is 0.3354 nm (3.354 angstroms). Also, as is known, the lattice spacing of a carbon precursor in which crystal structure is not so perfectly developed as in graphite is 0.3470 to 0.3600 nm (3.47 to 3.60 angstroms). In other words, the graphite (002) lattice spacing value is a parameter indicating the degree of development of the graphite-type crystallization. Accordingly, the graphitized carbon black according to the present invention is such that the aromatic network planes are laminated in a fairly highly regular manner, but the regularity of the graphitized carbon black does not reach the perfect layer structure possessed by graphite. In this connection, the hexagonal network planes of graphite are only bound to each other by the van der Waaals force and hence are weak in binding force, and hence graphite has self-lubricity and has a property such that pulverization easily convert graphite into slices. In the hexagonal network planes of graphite, n electrons moving like free electrons are present and hence graphite exhibits high conductivity. Accordingly, the graphitized carbon black according to the present invention has a high lubricity and a high electroconductivity, as compared to ordinary carbon black, due to the graphite-like crystal structure on the surface and in the vicinity of the surface of the graphitized carbon black. Consequently, the graphitized carbon black is satisfactory as compared to ordinary carbon black, with respect to the dispersibility in the coating material. When the graphitized carbon black is included in the resin layer, the excellent self-lubricity possessed by the graphitized carbon black enables to alleviate the attachment of the toner to the surface of the developer carrying member. Also, when the graphitized carbon black is included in the resin layer, the excellent electroconductivity possessed by the graphitized carbon black enables to impart high electroconductivity to the resin layer, and thus enables to obtain a developer carrying member contributing to the suppression of the excessive charging of the toner. Such a graphitized carbon black can be obtained by firing ordinary carbon black filled in a graphite crucible in a nonoxidative atmosphere at 1700 to 3200° C. The graphitized carbon black according to the present invention is completely different from the graphitized particles obtained by firing bulk mesophase pitch or mesocarbon in a nonoxidative atmosphere. Bulk mesophase pitch is an organic compound obtained by hydrogenating β-resin extracted by solvent separation from coal tar pitch. Mesocarbon microbeads are also an organic compound produced by refining petroleum heavy oil or by polycondensing petroleum heavy oil and refining the resulting product. Bulk mesophase pitch and mesocarbon microbeads are known as readily-graphitizable carbon materials. A readily-graphitizable carbon material means a carbon material readily producing the graphite structure having a three-dimensional lamination regularity by heat treatment at a high temperature of 2500° C. or higher; materials such as coke, in which mutual arrangement of crystal lattices are regular, are readily converted into graphite structure. Accordingly, graphitized particles obtained by firing bulk mesophase pitch or mesocarbon in a nonoxidative atmosphere undergo graphitization even in core portions. On the other hand, carbon black, which is a raw material for the component (D), is an inorganic compound. Carbon black is known as a hardly graphitizable carbon material. A hardly-graphitizable carbon-material means a carbon material that is extremely hardly converted into graphite even by heating in an inert atmosphere. Carbon black is considered to have curved structures constituted with five-membered carbon rings and six-membered carbon rings, or planar structures in which six-membered carbon rings are not developed. Probably, due to such steric restrictions, carbon black hardly undergoes easy conversion into graphite structure. The reasons for carbon black to hardly undergo conversion into graphite structure may also include a fact that the average primary particle size of carbon black is as extremely small as 10 to 100 nm. As described above, even by firing, carbon black hardly undergoes orientation of carbon layer planes to impede the graphitization, and hence probably the graphitized carbon black as the component (D) obtained from carbon black is graphitized only on the surface thereof and only in the vicinity of the surface thereof with the interior thereof free from graphitization. In this respect, the graphitized carbon black according to the present invention is to be considered as completely different in nature from the above-described graphitized particles.

The graphitized carbon black according to the present invention may be subjected to a surface reformation treatment in such a way that organic groups are covalently bonded to the surface of the graphitized carbon black. Examples of the method for subjecting the surface of the graphitized carbon black to a reformation treatment include a method in which the reformation treatment is performed with an organometallic compound containing at least one or more elements selected from the group consisting of titanium, aluminum, zirconium and silicon, and a method in which heating is performed in the presence of a radical polymerization initiator.

The mixing amount of the component (D) is preferably 1 part by mass to 100 parts by mass in relation to 100 parts by mass of the component (A). The mixing amount of the graphitized carbon black set to fall within this range enables to obtain a developer carrying member having an intended resistance value and an intended lubricity while maintaining the strength of the resin layer.

The mixing amount of the component (E) is preferably 5 parts by mass to 50 parts by mass in relation to 100 parts by mass of the component (D). The mixing amount of the acid carbon black set to fall within this range enables to obtain a developer carrying member with a uniform presence of the conductive agent without impairing the strength of the resin layer. The increase of the proportion of the graphitized carbon black yields a developer carrying member having lubricity.

The presence of the graphitized carbon black and the acid carbon black in the resin layer according to the present invention can be identified by a transmission electron microscope (TEM) or by Raman spectroscopy. Conductive agents other than the graphitized carbon black and the acid carbon black may also be included in the resin layer.

The volume resistance of the resin layer of the developer carrying member in the present invention is preferably $10^{-1}$ $\Omega \cdot cm$ or more and $10^2$ $\Omega \cdot cm$ or less. The volume resistance of the resin layer of the developer carrying member set to fall within this range enables to prevent the firm attachment of the toner, due to the charge-up of the toner, to the developer carrying member and the failure of the triboelectric charge imparting, co-occurring with the charge-up of the toner, to the toner from the surface of the developer carrying member. In particular, when the volume resistance of the resin layer of the developer carrying member exceeds $10^2$ $\Omega \cdot cm$, the failure of the triboelectric charge imparting to the toner tends to occur, and consequently, blotches (speckle-like, ripple-like or carpet-like images) and the image density decrease tend to occur.

In the present invention, roughening particles for forming asperities can be added in the electroconductive resin coating layer for the purpose of uniformizing the surface roughness and maintaining an appropriate surface roughness. The roughening particles are not particularly limited; however, specific examples of the roughening particles include the following: particles of rubbers such as EPDM rubber, NBR, SBR, CR and silicone rubber; particles of elastomers such as polystyrene, polyolefin, polyvinyl chloride, polyurethane, polyester and polyamide thermoplastic elastomers (TPE); particles of resins such as PMMA, urethane resin, fluororesin, silicone resin, phenolic resin, naphthalene resin, furan resin, xylene resin, divinylbenzene polymer, styrene-divinylbenzene copolymer and polyacrylonitrile resin; and particles of oxides such as alumina, zinc oxide, titanium oxide and tin oxide; electroconductive particles such as carbonized particles and resin particles treated to be electroconductive. In addition to these, others such as an organic compound such as an imidazole compound can also be used as particulate.

Examples of the substrate of the developer carrying member used in the present invention includes a cylindrical member, a columnar member and a belt-shaped member. As the material for such substrates, nonmagnetic metals and alloys such as aluminum, stainless steel and brass are preferably used. As the substrate in the case where a development method is used in which the developer carrying member is brought into direct contact with the photosensitive drum, a columnar member including an electroconductive cylindrical body and including an elastic layer provided around the electroconductive cylindrical body is preferably used. For the electroconductive cylindrical body, a conductive agent is used; examples of such a material may include aluminum, iron and stainless steel (SUS). For the elastic layer, silicone rubber, EPDM rubber or an elastomer such as urethane, or other resin molded bodies are used.

In a developing method using a magnetic toner, a magnet roller having a magnet as provided therein is disposed within the developer carrying member for the purpose of magnetically attracting and holding toners on the developer carrying member. In this case, the substrate may be cylindrical and the magnet roller may be disposed inside the substrate.

In a method for forming the resin layer, for example, the resin layer can be formed as follows: the individual components for the resin layer are dispersed and mixed in a lower alcohol to prepare a coating material, and coating material is applied to the substrate and is dried for solidification or cured. For dispersing and mixing the individual components in the coating material liquid, heretofore known dispersion apparatuses utilizing beads such as a sand mill, a paint shaker, a dyno-mill, and a pearl mill can be preferably used. As the coating method, heretofore known methods such as a dipping method, a spraying method and a roll coating method are applicable.

A standard of the surface roughness of the developer carrying member is, in terms of the arithmetic mean roughness Ra (JIS B0601-2001), 0.4 μm or more and 2.0 μm or less. A standard of the thickness of the electroconductive resin coating layer is 4 μm or more and 20 μm or less so as to easily obtain a uniform thickness.

<Developing Apparatus>

Next, the developing apparatus according to the present invention is described. FIG. 1 shows a schematic sectional view of the developing apparatus of an embodiment including the developer carrying member of the present invention. In FIG. 1, an electrostatic latent image carrying member holding electrostatic latent images formed by a heretofore known process such as an electrophotographic photosensitive drum 501 is rotated in the direction indicated by the arrow B. A developing sleeve 508 as the developer carrying member is rotated in the direction indicated by the arrow A while carrying a one-component developer 504 including a magnetic toner, fed by a hopper 503 as a developer vessel housing the developer. In this way, the developer 504 is conveyed into the development region D in which the developing sleeve 508 and the photosensitive drum 501 face each other. As shown in FIG. 1, inside the developing sleeve 508, a magnet roller 505 having a magnet as provided therein is disposed, so as to magnetically attract and hold the developer 504 on the developing sleeve 508.

The developing sleeve 508 includes an electroconductive resin coating layer 507 coated on a metal cylindrical pipe 506 as the substrate. In the hopper 503, a stirring blade 510 for stirring the developer 504 is provided. The reference numeral 513 denotes the space indicating that the developing sleeve 508 and the magnet roller 505 are in a noncontact condition. The developer 504 acquires the triboelectrically produced charge capable of developing the electrostatic latent image on the photosensitive drum 501 due to the friction between the magnetic toner particles constituting the developer and the friction between the magnetic toner and the electroconductive resin coating layer 507 on the developing sleeve 508. In the example of FIG. 1, for the purpose of controlling the thickness of the developer 504 conveyed to the development region D, an elastic controlling blade 511 is used as the developer thickness controlling member. The elastic controlling blade 511 is made of a material having rubber elasticity, such as urethane rubber or silicone rubber or made of a material having metal elasticity, such as phosphor bronze or a stainless steel. The elastic controlling blade 511 is pressed for contact against the developing sleeve 508 so as to be inclined in the direction reverse to the rotation direction of the developing sleeve 508. In such a developing apparatus, by elastically pressing for contact the developer thickness controlling member against the developing sleeve 508 through the intermediary of the developer layer, a thin layer of the developer is formed on the developing sleeve.

The thickness of the thin layer of the developer 504 thus formed on the developing sleeve 508 is preferably further thinner than the minimum space, in the development region D, between the developing sleeve 508 and the photosensitive drum 501. It is particularly effective to incorporate the developer carrying member of the present invention into a developing apparatus adopting a method for developing electrostatic latent images with such a thin layer of the developer as described above, namely, a noncontact-type developing apparatus. The developer carrying member of the present invention is also applicable to a developing apparatus in which the thickness of the developer layer, in the development region D, is equal to or larger than the minimum space between the developing sleeve 508 and the photosensitive drum 501, namely, a contact-type developing apparatus. In order to avoid cumbersomeness in description, the following description is made by adopting as an example such a non-contact-type developing apparatus as described above.

For the purpose of allowing the one-component developer 504, including the magnetic toner, carried by the developing sleeve 508 to fly, a development bias voltage is applied by a development bias power source 509 as a biasing unit to the developing sleeve 508. When a direct current voltage is used as the development bias voltage, it is preferable to apply to the developing sleeve 508 the voltage corresponding to the intermediate value between the electric potential of the image portion (the portion to be visualized by the attachment of the developer 504) of the electrostatic latent image and the electric potential of the background portion.

In the case of the so-called regular development in which visualization is performed by attaching the toner to the higher electric potential portion of an electrostatic latent image having a higher electric potential portion and a lower electric potential portion, a toner to be charged in a polarity reverse to the polarity of the electrostatic latent image is used. In the case of the so-called inverse development in which visualization is performed by attaching the toner to the lower electric potential portion of an electrostatic latent image having a higher electric potential portion and a lower electric potential portion, a toner to be charged in the same polarity as the polarity of the electrostatic latent image is used. The high electric potential and the low electric potential as referred to herein are expressed in terms of the absolute values. In any of these cases, the developer 504 is charged by the friction with the developing sleeve 508.

Figure 2:
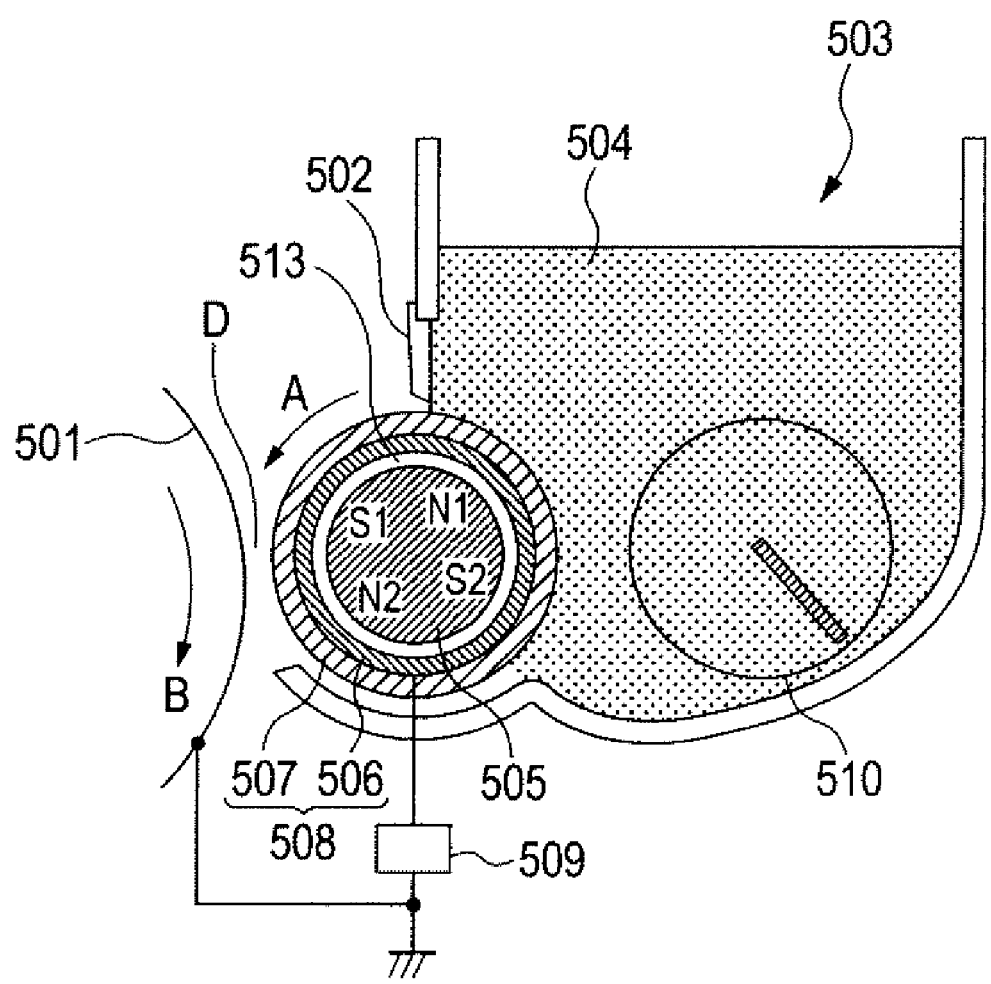
FIG. 2 is a sectional view illustrating another example of the developing apparatus according to the present invention.
Figure 3:
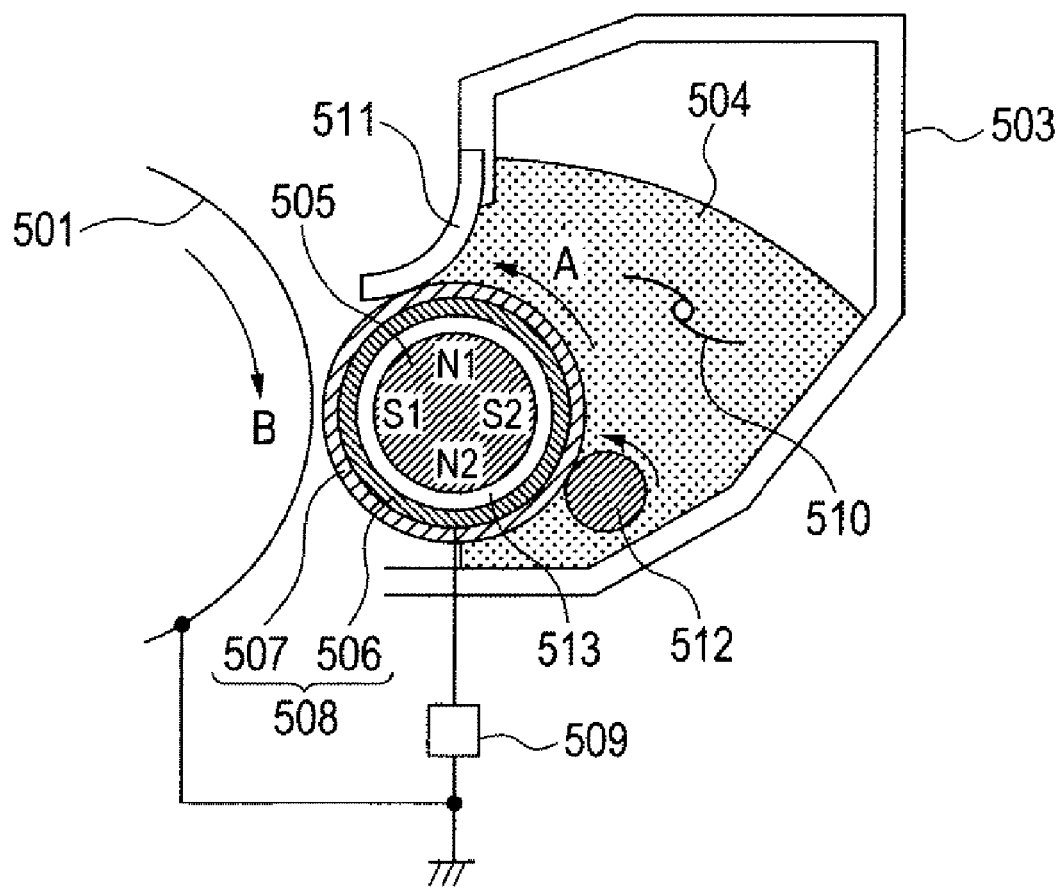
FIG. 3 is a sectional view illustrating another example of the developing apparatus according to the present invention.

FIGS. 2 and 3 each are a schematic sectional view illustrating a developing apparatus using a magnetic toner. In the developing apparatus of FIG. 2, a magnetic controlling glade 502 made of a ferromagnetic metal is used as the developer thickness controlling member. The blade 502 hangs down from the hopper 503, so as to approach the developing sleeve 508 with a gap width of about 50 to 500 μm from the surface of the developing sleeve 508. The lines of magnetic force from the magnetic pole N1 of the magnet roller 505 are concentrated toward the magnetic controlling blade 502, and thus the thin layer of the developer 504 is formed on the developing sleeve 508. A nonmagnetic blade can also be used in place of the magnetic controlling blade 502. In the developing apparatus of FIG. 3, the elastic controlling blade 511 is pressed for contact against the developing sleeve 508 so as to be inclined in the same direction as the rotation direction of the developing sleeve 508, and further, a peeling member 512 is provided. As the peeling member, a roller member made of a resin, a rubber or a sponge, and further a belt member and a brush member are used. In FIG. 3, the roller-shaped peeling member 512 is rotated in the direction reverse to the rotation direction of the developing sleeve 508. The functions of the peeling member 512 are such that the developer remaining untransferred for development to the photosensitive drum 501 is once peeled off with the peeling member 512 from the sleeve surface so as to prevent the occurrence of the immobile toner on the sleeve, and the charging of the developer is uniformized.

Figure 4:
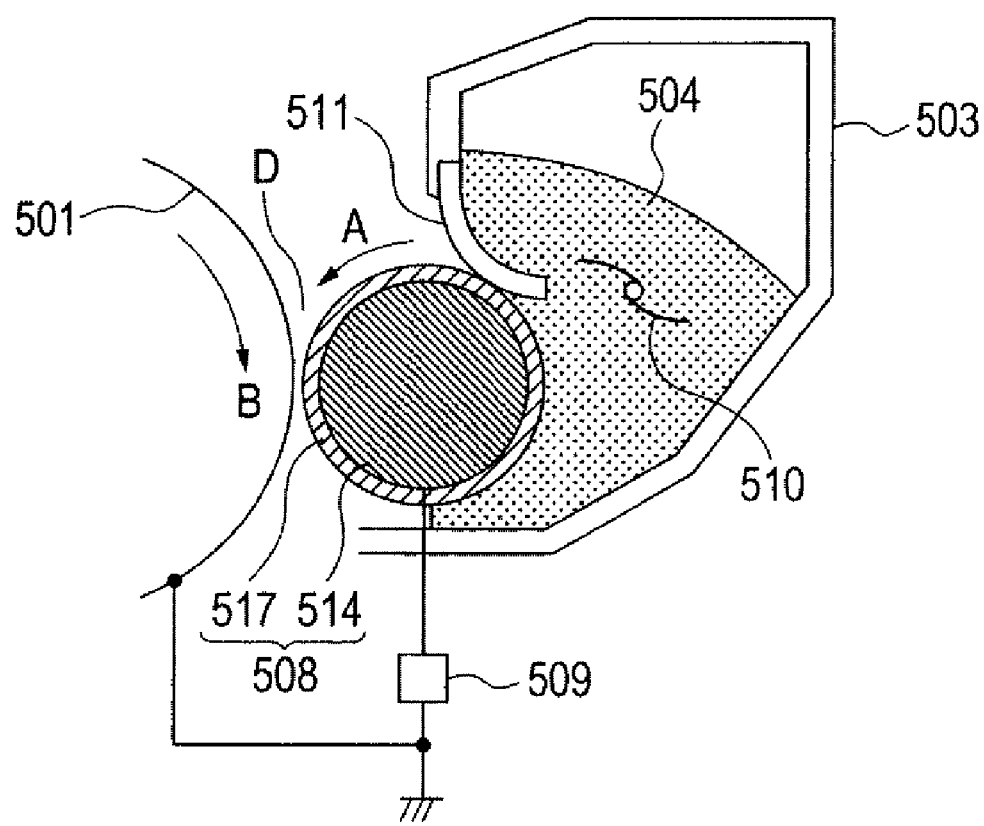
FIG. 4 is a sectional view illustrating another example of the developing apparatus according to the present invention.
Figure 5:
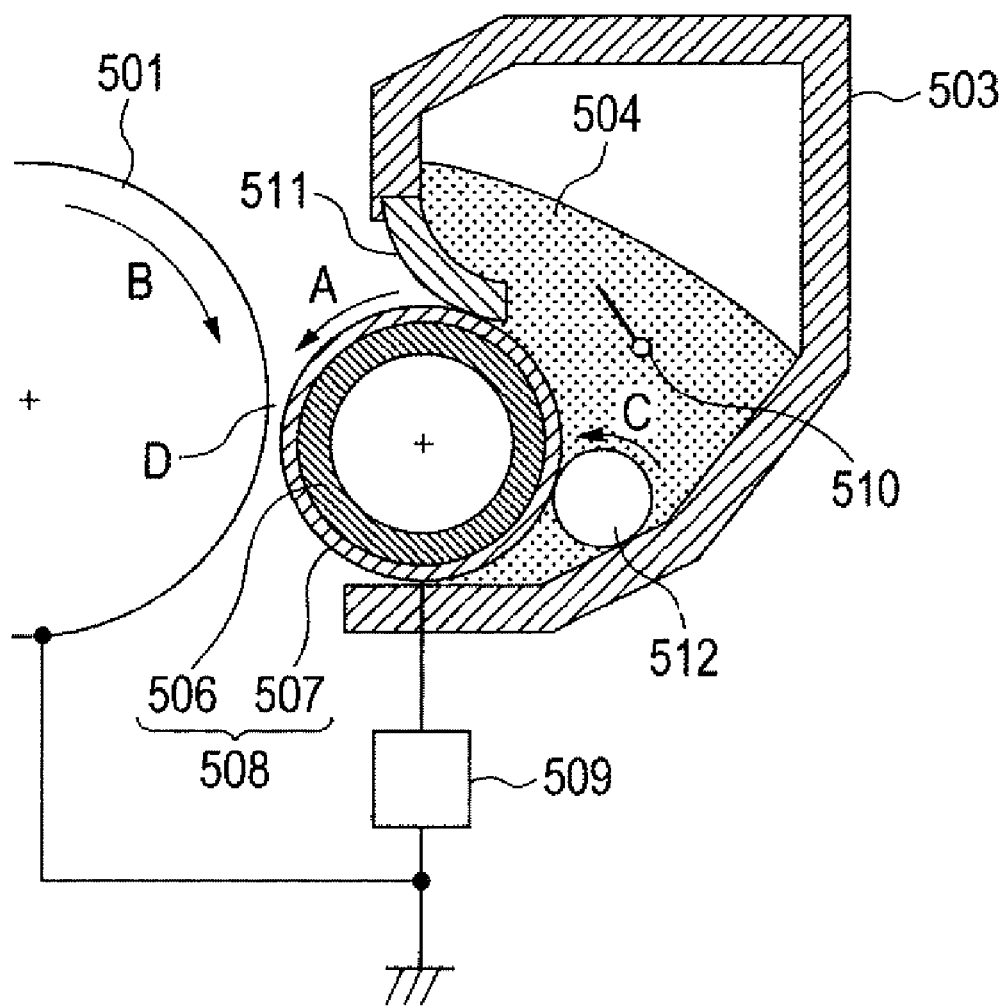
FIG. 5 is a sectional view illustrating yet another example of the developing apparatus according to the present invention.

FIG. 4 shows a developing apparatus in the case where a nonmagnetic one-component developer is used as the toner 504; the toner is nonmagnetic, and hence no magnet is present in the developing sleeve, and solid metal rod 514 is used as the sleeve. The nonmagnetic toner is triboelectrically charged due to the friction with the thickness controlling blade 511 or with a sleeve coat layer 517, and is carried on the surface of the developing sleeve 508 to be conveyed. In FIG. 5, in addition to the above-described members, a peeling member 512 is provided. In the example shown in FIG. 5, a metal cylindrical pipe is used for the developing sleeve 508. The fundamental constitution with respect to the other members in each of the developing apparatuses shown in FIGS. 2 to 5 is the same as in the developing apparatus shown in FIG. 1, and the same symbols represent fundamentally the same members.

Next, the developer including the toner particles, used in the developing apparatus incorporating the developer carrying member of the present invention is described. The toner particles of the present invention can be produced by a pulverizing method or a polymerization method.

In general, toner particles being high in the degree of spherization are high in charge amount, and charge-up occurs due to too high triboelectric charges depending on the use conditions as the case may be. In particular, the developer carrying member used in the present invention can maintain an appropriate triboelectric charge imparting capability, without causing charge-up, with respect to such toner particles being high in degree of spherization, at the initial stage of use and in a case where endurance has proceeded. Accordingly, the developer carrying member of the present invention can be more preferably used in combination with such toners being high in degree of spherization. The toners usable in the present invention is preferably such that for the purpose of developing with fidelity finer latent image dots for the case of high image quality, the weight average particle size of the toner of the present invention is 3 μm or more and 10 μm or less. For the purpose of improving the triboelectric charging property, the charge controlling agent can be included in the toner particles (internal addition), or the charge controlling agent can be used as mixed with the toner particles (external addition). Further, for the purpose of improving the environmental stability, the triboelectric charge stability, the developability, the fluidity and the storage stability and improving the cleaning property, it is preferable to externally add to the toner, namely, to make present in the vicinity of the toner surface, inorganic fine powders such as the fine powders of silica, titanium oxide and alumina.

In the developer carrying member used in the present invention, uniform lubricity is imparted to the surface of the developer carrying member by combining graphitized carbon black and acid carbon black. Accordingly, when the toners using waxes having low-melting points are used, the developer carrying member of the present invention is free from the adverse effects such as the contamination of the developer carrying member due to the toner, and can be preferably used.

EXAMPLES

Hereinafter, the present invention is specifically described with reference to Production Examples and Examples. In what follows, proportions given in parts mean proportions given in parts by mass, unless otherwise specified. First, the measurement methods of the physical properties in the present invention are described.

<Measurement of Arithmetic Mean Roughness (Ra) of Developer Carrying Member Surface>

The measurement of the arithmetic mean roughness (Ra) of the developer carrying member surface was performed on the basis of the surface roughness of JIS B0601 (2001) with the Surfcorder SE-3500 manufactured by Kosaka Laboratory Ltd., under the measurement conditions that the cutoff was 0.8 mm, the evaluation length was 8 mm and the feeding speed was 0.5 mm/s. The measurement was performed for the following nine points: three positions in the axial direction, namely, the central position and the two positions between the central position and the both ends of the coated portion; similar three positions after a rotation by 120° of the developer carrying member; and similar three positions after a further rotation by 120° of the developer carrying member. The average value of these measured values was taken as the arithmetic mean roughness Ra of the developer carrying member surface.

<Analysis Method of Additive Resin>

The structure of the polymer of the additive resin was determined by analyzing with a thermolysis GC/MS apparatus, Voyager (trade name: manufactured by Thermo Electron Corp.). The analysis was performed under the following conditions: thermolysis temperature: 600° C., column: HP-1 (15 m×0.25 mm×0.25 μm), inlet: 300° C., split: 20.0, injection rate: 1.2 ml/min, temperature rise profile: 50° C. (maintained for 4 min.)–300° C. (20° C./min.).

<Measurement of Graphite (002) Lattice Spacing by X-Ray Diffraction of Graphitized Carbon Black>

A graphitized carbon black powder was used as the measurement sample, a horizontal sample mount intense X-ray diffractometer, RINT/TTR-II (trade name, manufactured by Rigaku Corp.) was used, and thus the concerned spacing was determined from the X-ray diffraction spectrum. First, the measurement sample was filled in the non-reflection sample plate, the Cu Kα line monochromatized with a monochromator was used as the radiation source, and thus an X-ray diffraction chart was obtained. From the chart, the peak position of the graphite (002) diffraction line was determined, and the lattice spacing was calculated on the basis of the Bragg formula (the following formula (1)). Herein, the wavelength λ of the Cu Kα line was 0.15418 nm.

$$\text{Lattice spacing (002)} = \lambda/2 \sin \theta, \quad \text{formula (1)}$$

Main measurement conditions were as follows:
Optical system: Parallel beam optical system
Goniometer: Rotor horizontal goniometer (TTR-2)
Tube voltage/tube current: 50 kV/300 mA
Measurement method: Continuous method
Scanning axis: 2θ/θ
Measurement angle: 10° to 50°
Sampling interval: 0.02°
Scanning speed: 4°/min
Divergence slit: Open
Divergence vertical slit: 10 mm
Scattering slit: Open
Receiving slit: 1.00 mm <Measurement of pH of Acid Carbon Black>

The pH of a solution prepared by extraction with a boiling method was measured with a pH meter, according to JIS K5101 (1991). The pH meter used was an apparatus adopting a measurement method using a glass electrode, having a pH measurement range from 0 to 14 (resolution: 0.01), and setting the measurement temperature at 20° C. to 25° C.

<Measurement of Average Circularity of Toner Particles>

The average circularity in the present invention was used as a simple method for quantitatively representing the particle shape. In the present invention, the measurement was performed with a flow particle image analyzer, FPIA-1000, manufactured by TOA Medical Electronics Co., Ltd., a group of particles each having a corresponding circle diameter of 3 µm or more were measured, and the circularity (Ci) of each of the particles was determined on the basis of the following formula. The average circularity was defined as the arithmetic average of the circularities of the individual particles.

Circularity (Ci)=(Circumferential length of a circle having the same projected area as the particle image)/(circumferential length of the projected image of the particle)

In the measurement apparatus, FPIA-1000, after the calculation of the circularity of each of the particles, the following method is used for the derivation of the average circularity and the mode circularity. In the method, according to the obtained circularities, the particles are classified into 61 divisions in such a way that the circularities of from 0.40 to 1.00 are classified with an interval of 0.010 into 61 divisions, and the average circularity is derived by using the central values and the frequencies of the points of divisions. However, the errors of the individual values of the average circularity derived from this derivation method with reference to the individual values of the circularity derived from the derivation formula which directly uses the above-described circularities of the individual particles are extremely small to a substantially negligible degree. Accordingly, in the present invention, on the grounds of the data processing including the reduction of the derivation time and the simplification of the derivation expression, such a derivation method was used in which the concept of the above-described derivation formula directly using the circularities of the individual particles was utilized with a partial modification. The average circularity in the present invention is an index of the degree of irregularity of the particle, exhibits a value of 1.000 for a perfectly spherical particle and is decreased with the increase of the complexity of the surface shape of the toner.

<Production Example of Additive Resin Solution B-1>

In a four-mouth separable flask equipped with a stirrer, a condenser, a thermometer, a nitrogen introduction tube and a dropping funnel, the following materials were mixed and stirred until the system became uniform.

Dimethylaminoethyl methacrylate: 36.5 parts
Lauryl bromide (quaternarizing agent): 63.5 parts
Ethanol: 50 parts While stirring was being continued, the resulting reaction mixture was increased in temperature to 70° C., then stirred for 5 hours to quaternarize the monomer, and thus (2-methacryloyloxyethyl)lauryldimethylammonium bromide, which is a quaternary ammonium base-containing monomer, was obtained. The obtained reaction solution was cooled, and then 50 parts of ethanol as a solvent and 1.0 part of azobisisobutyronitrile (AIBN) as a polymerization initiator were placed in the dropping funnel and the system was stirred until the system became uniform. While stirring was being continued, the reaction system was increased in temperature until the temperature in the reaction system reached 70° C., the ethanol solution containing the polymerization initiator, placed in the dropping funnel, was added to the reaction system over 1 hour. After the completion of the dropwise addition, the reaction system was allowed to react further for 5 hours under reflux condition with introduction of nitrogen, then 0.2 part of AIBN was added and then the reaction system was allowed to react for 1 hour. Further, the resulting solution was diluted with ethanol to yield the additive resin solution B-1 with a solid content of 40%. The structure of the obtained additive resin solution B-1 is shown in Table 2.

<Production Examples of Additive Resin Solutions B-2 to B-15>

The additive resin solutions B-2 to B-15 were obtained in the same manner as in the production example of the additive resin solution B-1 except that the components used were altered to the components shown in Table 1. The additive resin solution B-11 was subjected to the exchange of the anions, after the completion of the preparation of the solution, from the bromide ion to the p-toluenesulfonic acid ion by using an ion exchange resin. The structures of the obtained additive resin solutions B-2 to B-15 are shown in Table 2.

<Production Example of Additive Resin Solution B-16>

In a four-mouth separable flask equipped with a stirrer, a condenser, a thermometer, a nitrogen introduction tube and a dropping funnel, the following materials were mixed and stirred until the system became uniform.

Dimethylaminoethyl methacrylate: 36.5 parts
Lauryl bromide (quaternarizing agent): 63.5 parts
Ethanol: 50 parts While stirring was being continued, the resulting reaction mixture was increased in temperature to 70° C., then stirred for 5 hours to quaternarize the monomer, and thus (2-methacryloyloxyethyl)lauryldimethylammonium bromide, which is a quaternary ammonium base-containing monomer, was obtained. The obtained reaction solution was cooled, and then 5.2 parts of octyl acrylate as a copolymerization component, 50 parts of ethanol as a solvent and 1.0 part of azobisisobutyronitrile (AIBN) as a polymerization initiator were placed in the dropping funnel and the system was stirred until the system became uniform. While stirring was being continued, the reaction system was increased in temperature until the temperature in the reaction system reached 70° C., the solution placed in the dropping funnel was added to the reaction system over 1 hour. After the completion of the dropwise addition, the reaction system was allowed to react further for 5 hours under reflux condition with introduction of nitrogen, then 0.2 part of AIBN was added and then the reaction system was allowed to react for 1 hour. Further, the resulting solution was diluted with ethanol to yield the additive resin solution B-16 with a solid content of 40%. The structure of the obtained additive resin solution B-16 is shown in Table 2.

<Production Examples of Additive Resin Solutions B-17 to B-30>

The additive resin solutions B-17 to B-30 were obtained in the same manner as in the production example of the additive resin solution B-1 and the production example of the additive resin solution B-16 except that the components used were altered to the components shown in Table 1. The structures of the obtained additive resin solutions B-17 to B-30 are shown in Table 2.

<Production Examples of Additive Resin Solutions b-1 to b-5>

The additive resin solutions b-1 to b-5 were obtained in the same manner as in the production example of the additive resin solution B-1 except that the components used were altered to the components shown in Table 1. The structures of the obtained additive resin solutions b-1 to b-5 are shown in Table 2.

<Binder Resin (Component (A))>
Hereinafter, the specific examples of the binder resins used in Examples are shown.

| Binder Resin 1 | Resol-type phenolic resin (trade name: J-325, solid content: 60%, manufactured by Dainippon Ink and Chemicals Inc.) |
| Binder Resin 2 | Butylated melamine resin (trade name: L-109-65, solid content: 60%, manufactured by Dainippon Ink and Chemicals Inc.) |
| Binder Resin 3 | Silicone resin (trade name: TSR127B, solid content: 50%, manufactured by Momentive Performace Materials Japan LLC) |
| Binder Resin 4 | Acrylic resin (trade name: A-430-60, solid content: 60%, manufactured by Dainippon Ink and Chemicals Inc.) |

<Production Example of Graphitized Carbon Black (Component (D)): G-1>

Carbon black (trade name: Toka Black #5500, manufactured by Tokai Carbon Co., Ltd.) was placed in a graphite crucible, and heat treated in a nitrogen gas atmosphere at 2500° C. for graphitization to yield the graphitized carbon black G-1. The values of the physical properties of the obtained graphitized carbon black are shown in Table 3.

<Production Examples of Graphitized Carbon Blacks (Components (D)): G-2 to G-7>

The graphitized carbon blacks G-2 to G-7 usable in the present invention were produced by subjecting to a graphitization treatment carbon blacks different in particle size in the same manner as in the production example of the graphitized carbon black G-1. The graphitization treatment was such that carbon black was filled in a graphite crucible and heat treated in a nitrogen gas atmosphere at 1000° C. to 3000° C. The values of the physical properties of the obtained graphitized carbon blacks are shown in Table 3.

<Acid Carbon Blacks (Components (E): A-1 to A-6 and Neutral Carbon Black a-1>

The acid carbon blacks A-1 to A-6 and the neutral carbon black a-1 used in the present invention are shown in Table 4.

<Production Example of Toner 1>

A mixture was prepared which was composed of 73.5 parts of styrene, 19 parts of n-butyl acrylate, 7 parts of monobutyl maleate, 0.5 part of divinylbenzene, 1 part of benzoyl peroxide and 0.5 part of di-t-butylperoxy-2-ethyl hexanoate. To the mixture, 180 parts of water dissolving 0.8 part of a partially saponified polyvinyl alcohol was added, and vigorously stirred to prepare a suspension dispersion. The suspension dispersion was placed in a reactor in which 40 parts of water was placed and the air therein was replaced with nitrogen, and was subjected to suspension polymerization at a reaction temperature of 85° C. for 10 hours. After the completion of the reaction, a vinyl resin was obtained through filtration, water washing, dehydration and drying steps.

Next, a mixture composed of the following materials was prepared.

Above-described vinyl resin: 100 parts

Spherical magnetic material having an average particle size of 0.2 μm: 90 parts

Azo iron complex compound (negatively chargeable charge controlling agent, trade name T-77, manufactured by Hodogaya Chemical Co., Ltd.): 1 part Stearyl stearate wax (DSC main peak: 60° C.): 5 parts The mixture was kneaded with a twin screw kneader-extruder heated to 130° C. The obtained kneaded mixture was cooled and then coarsely crushed with a hammer mill; the obtained coarsely crushed product was finely pulverized with a mechanical pulverizer Turbo Mill (manufactured by Turbo Kogyo Co., Ltd.), and then the resulting fine powder was subjected to a thermal spherization treatment. The fine powder subjected to the thermal spherization treatment was classified with a multi-division classifier (Elbojet Classifier, manufactured by Nittetsu Mining Co., Ltd.), taking advantage of the Coanda effect, in such a way that ultrafine powder and coarse powder were simultaneously removed by classification; and thus the toner particles having a weight average particle size (D4) of 6.0 μm and a circularity of 0.963 were obtained. To 100 parts of the toner particles, 1.0 part of hydrophobic colloidal silica was added, and mixed and dispersed with a Henschel mixer to yield the magnetic one-component toner 1.

<Production Example of Toner 2>

To 900 parts of ion-exchanged water warmed to a temperature of 60° C., 4 parts of tricalcium phosphate was added, and the resulting mixture was stirred with a TK-type homomixer (manufactured by Tokushu Kika Kogyo Co., Ltd.) at 10,000 rpm to prepare an aqueous medium. On the other hand, the following composition was placed in the TK-type homomixer (manufactured by Tokushu Kika Kogyo Co., Ltd.), warmed to a temperature of 60° C., and then stirred at 9,000 rpm to be dissolved and dispersed.

Styrene: 160 parts n-Butyl acrylate: 40 parts

C. I. Pigment red 2: 16 parts

Aluminum salicylate compound (Bontron E-88, manufactured by Orient Chemical Industries Co., Ltd.): 2 parts Polyester resin (polycondensate between propylene oxide-modified bisphenol A and isophthalic acid, Tg=65° C., Mw=10000, Mn=6000): 7 parts Stearyl stearate wax (DSC main peak: 60° C.): 20 parts Divinylbenzene: 0.2 part In the resulting mixture, 20 parts of a polymerization initiator, t-butylperoxy pivalate was dissolved to prepare a polymerizable monomer composition. The prepared polymerizable monomer composition was placed in the above-described aqueous medium and stirred to be suspended at a temperature of 60° C. in a nitrogen atmosphere with the TK-type homomixer at 9,000 rpm. Then, the resulting suspension was transferred to a propeller type stirrer, increased in temperature under stirring to a temperature of 70° C. over 3 hours, and further after 4 hours, increased in temperature to a temperature of 80° C. at a temperature increase rate of 40° C./hr, and was allowed to react at the temperature of 80° C. for 5 hours to produce polymer particles. After the completion of the reaction, the slurry containing the particles was cooled, washed with water in an amount of ten times the amount of the slurry, filtered, then dried under a pressure of $6.67 \times 10^{-1}$ kPa at a temperature of 40° C. for 48 hours, and further classified to yield particle-size-regulated magenta toner particles.

With 100 parts of the above-described magenta toner particles, 1.5 parts of hydrophobic silica fine powder treated with silicone oil, chargeable in the same polarity (negative polarity) as the polarity of the toner particles, was mixed by using a Henschel mixer (manufactured by Mitsui Miike Machinery Co., Ltd.) for 5 minutes to yield the nonmagnetic one-component toner 2. The primary particle size and the BET specific surface area of the hydrophobic silica fine powder were 10 nm and 170 m²/g, respectively. The weight average particle size and the average circularity of the obtained nonmagnetic one-component toner were 6.6 μm and 0.984, respectively.

Example 1

<Preparation of Coating Material Intermediate>

A coating material intermediate was obtained by mixing the following materials and by dispersing the materials for 2 hours with a sand mill using glass beads of 1 mm in diameter as medium particles.

Binder resin 1 as solid content: 20 parts
Graphitized carbon black G-1: 10 parts
Acid carbon black A-1: 10 parts
Ethanol: 50 parts <Preparation of Coating Material for Resin Layer>

Next, a coating material for the resin layer was obtained by mixing the following materials with the coating material intermediate, and by dispersing the materials for 40 minutes with a sand mill using glass beads of 1.5 mm in diameter as medium particles.

Binder resin 1 as solid content: 20 parts
Resin B-1 as solid content: 4 parts
NICA beads ICB-1020 (trade name, manufactured by Nippon Carbon Co., Ltd.): 2 parts <Formation of Resin Layer>

Next, ethanol was added to the coating material for the resin layer and the solid content concentration of the coating material was regulated to be 35%. An aluminum cylindrical pipe having an outer diameter of 20 mmΦ was stood on a rotating base and rotated, both ends of the cylindrical pipe were masked, and the surface of the cylindrical pipe was coated with the coating material for the resin layer while an air spray gun was being moved downward at a constant rate. The resin layer was formed by this step. The coating was performed under the coating conditions that the environment was set at 30° C. and 35% RH and the temperature of the coating material for the resin layer was controlled at 28° C. with a thermostatic bath. Successively, the resin layer was cured by heating at 150° C. for 30 minutes with a hot air drying furnace, to prepare the developer carrying member S-1 of Ra=1.35 μm. The formulation of the resin layer of the developer carrying member (developing sleeve) S-1 is shown in Table 5.

<Image Evaluation>

A magnet roller was inserted into and then flanges were attached to the developer carrying member S-1, and then the developer carrying member was incorporated into the developing unit of the digital multifunctional copier iR2030 (trade name, manufactured by Canon Inc.) to be used as a developing apparatus. By using the magnetic one-component toner 1, with an intermittent mode of 1 sheet/15 seconds, a 150,000-sheet image print-out of a character pattern of a coverage rate of 1% was performed, and the print-out results were evaluated with respect to the following items (1) to (4). As can be seen from the results shown in Table 6, satisfactory developability was always able to be obtained in any environment.

(1) Image Density

An image print-out test was performed in an environment of a temperature of 30° C. and a humidity of 85% RH (hereinafter, also referred to as the "H/H" environment); in the initial stage, solid images were printed out, and the image densities thereof were measured. For the purpose of evaluating the rise of the triboelectric charging, the developing apparatus was allowed to stand for 10 days after a 150,000-sheet passage, then a solid image was printed out, and the density of the printed image was measured to evaluate the rise of the triboelectric charging. The image density was measured with the MacBeth reflection densitometer, RD918 (trade name, manufactured by MacBeth Co., Ltd.), as the relative density in relation to the image corresponding to the white background portion having an original image density of 0.00.

(2) Blotches

An image print-out test was performed in an environment of a temperature of 15° C. and a humidity of 10% RH (hereinafter, also referred to as the "L/L" environment); a halftone image and a solid black image were printed out, and the occurrence of blotches (speckle-like, ripple-like or carpet-like blotches), tending to occur due to the excessive charging of the toner, was evaluated on the basis of the following standards.

A: No blotches can be identified either in the halftone image or on the sleeve.
B: Blotches are identified on the sleeve, but such blotches do not affect the image.
C: Blotches are identified partially on the halftone image, but no blotches are identified on the solid black image.
D: Blotches can be identified both on the halftone image and on the solid black image.

(3) Ghost

An image print-out test was performed both in the H/H environment and in the L/L environment, and the ghost of the sleeve period was evaluated. A printed out image of a printer was used in which solid black squares (one side: 20 mm) were arranged on the white back ground with equally spaced intervals in the area of the leading end of the image, corresponding to one full rotation of the developer carrying member and the portion other than such an area was made to be halftone. Ranking was performed on the basis of how the ghost of the square images appeared on the halftone area.

A: Ghost can be observed depending on the viewing angle, and the density difference almost cannot be identified.
B: Density difference can be observed, but is of the level provoking no problems with respect to the image quality.
C: Ghost can be visually definitely identified, but is of a lower limit level permitting practical use.
D: Ghost appears as the density difference, and the density difference can be measured with a reflection densitometer.

(4) Contamination Resistance of Resin Layer

In the H/H environment, the surface of the developer carrying member after the image pint-out test was observed with a laser microscope (trade name: VK-8700, manufactured by Keyence Corp.) at a magnification of about 1000, and the degree of the toner contamination was evaluated on the basis of the following standards.

A: Only slight contamination is observed.
B: Contamination is somewhat observed.
C: Contamination is partially observed.
D: Remarkable contamination is observed.

Examples 2 to 61 and Comparative Examples 1 to 13

The developing sleeves S-2 to S-74 were prepared in the same manner as in Example 1 with the formulations listed in Table 5, and were evaluated. These sleeves were prepared with the appropriately regulated solid content concentrations of the coating materials for the resin layer. The results thus obtained are shown in Table 6. As can be seen from these results, the addition of the additive resin of the present invention in the resin layer achieved satisfactory image densities even in a severe environment such as a high-temperature high-humidity environment. The image density was proportional to the triboelectric charge amount of the toner, and the introduction of the long-chain alkyl group into the quaternary ammonium base enabled to obtain satisfactory evaluation results. Specifically, by designing at least one of $R_3$, $R_4$ and $R_5$ shown in formula (1) to be a group having 4 or more carbon atoms, satisfactory image densities were able to be attained and rank c or higher evaluations were able to be attained for the other image evaluation items. On the other hand, when the number of carbon atoms in the long-chain alkyl group exceeded 18, although the triboelectric charge imparting capability to the toner was increased, the compatibility with the thermosetting resin was relatively decreased, and the evaluations with respect to ghost and blotches in the L/L environment were low.

With respect to the graphitized carbon black, it has been found that with the decrease of the graphite (002) lattice spacing, the triboelectric charge imparting capability to the toner, the lubricity and the dispersibility to the solvent are improved. Specifically, with the decrease of the graphite (002) lattice spacing, the image density, contamination resistance and ghost in the H/H environment and the blotches and ghost in the L/L environment were improved. With respect to the acid carbon black, with the decrease of the pH, the dispersibility in the coating material was improved, and the negative chargeability is strengthened, the disintegration of the aggregation of the graphitized carbon black was facilitated, developer carrying members uniformly containing a conductive agent were obtained. Consequently, the image density, contamination resistance and ghost in the H/H environment and the blotches and ghost in the L/L environment were improved.

In Examples 44 to 58, the evaluations were performed also with respect to the copolymer between the unit (1) and the unit (4). By adopting the copolymer between the unit (1) and the unit (4), the dispersibility in the solvent was made further better. However, when the amount of the unit (4) was large, the triboelectric charge imparting capability tended to be degraded, and the image density tended to be decreased. With respect to the structure of the unit (4), when the number of the carbon atoms in the long-chain alkyl group was less than 8 or exceeds 18, the dispersibility of the additive resin or the conductive agent in the solvent tended to be degraded, and the evaluations tended to be relatively low for the image density, contamination resistance and ghost in the H/H environment and the blotches and ghost in the L/L environment.

As revealed from Examples 52 to 55, the number of the carbon atoms of the long-chain alkyl group in the unit (1) designed to be 8 or more and 14 or less led to a satisfactory dispersibility of the additive resin or the conductive agent in the solvent, and accordingly achieved satisfactory images. As verifiable from Examples 40 to 43 and 56 and 57, also when X of the unit (1) was —CONH— or —$C_6H_4$—, satisfactory images were obtained.

Comparative Examples 3 and 4 used the graphitized carbon black in which the graphite (002) lattice spacing exceeded 0.3450 nm. Comparative Example 5 used the carbon black in which the pH exceeded 5.0. Comparative Examples 8, 9 and 10 performed the evaluations for the developer carrying members without addition of the additive resin, the graphitized carbon black and the acid carbon black, respectively. In Comparative Example 8 in which no additive resin was added, the deficiency of the triboelectric charge imparting capability to the developer was conspicuous, and no intended image density was obtained in the second half of the endurance. On the other hand, in each of Comparative Examples 3 and 4 in which the graphitized carbon black of the present invention was not added, the deficiency of the lubricity of the developer carrying member was conspicuous, and the contamination of the developer carrying member in the H/H environment was identified. In each of Comparative Examples 5 and 10 in which the acid carbon black of the present invention was not added, the dispersibility of the graphitized carbon black was insufficient, and accordingly, the triboelectric charge amount distribution of the toner was made nonuniform and the image failure such as ghost or blotches occurred.

In Comparative Example 7 in which the binder resin was altered to an acrylic resin, in particular, the developability in the second half of the endurance was degraded, and in Comparative Example 6 in which the solvent was altered to toluene, the dispersibility of the additive resin or the conductive agent was degraded; in each of these Comparative Examples, the image failure occurred.

Example 62

<Preparation of Coating Material Intermediate>

A coating material intermediate was obtained by mixing the following materials and by dispersing the materials for 2 hours with a sand mill using glass beads of 1 mm in diameter as medium particles.

Binder resin 1 as solid content: 20 parts
Graphitized carbon black G-1: 8 parts
Acid carbon black A-1: 8 parts
Ethanol: 50 parts <Preparation of Coating Material for Resin Layer>

Next, a coating material for the resin layer was obtained by mixing the following materials with the coating material intermediate, and by dispersing the materials for 40 minutes with a sand mill using glass beads of 1.5 mm in diameter as medium particles.

Binder resin 1 as solid content: 20 parts
Resin B-1 as solid content: 4 parts

<Formation of Resin Layer>

Next, ethanol was added to the coating material for the resin layer and the solid content concentration of the coating material was regulated to be 33%. An aluminum cylindrical pipe having an outer diameter of 12 mmΦ and an arithmetic mean roughness Ra=0.2 μm was stood on a rotating base and rotated, both ends of the cylindrical pipe were masked, and the surface of the cylindrical pipe was coated with the coating material for the resin layer while an air spray gun was being moved downward at a constant rate. The resin layer was formed by this step. The coating was performed under the coating conditions that the environment was set at 30° C. and 35% RH and the temperature of the coating material for the resin layer was controlled at 28° C. with a thermostatic bath. Successively, the resin layer was cured by heating at 150° C. for 30 minutes with a hot air drying furnace, to prepare the developer carrying member S-75 of Ra=0.50 μm. The formulation of the resin layer of the developer carrying member (developing sleeve) S-75 is shown in Table 7.

<Image Evaluation>

The developer carrying member S-75 was incorporated into the magenta cartridge of a laser beam printer (trade name: Laser Jet 5000, manufactured by Hewlett-Packard Co.). By using the nonmagnetic one-component toner 2, with an intermittent mode of 1 sheet/10 seconds, a 6,000-sheet image print-out of a character pattern of a coverage rate of 1% was performed, and the print-out results were evaluated with respect to the following items (5) to (8). As can be seen from the results shown in Table 8, satisfactory developability was always able to be obtained in any environment.

(5) Initial Stage Halftone (HT) Uniformity

In the low-temperature low-humidity environment (temperature: 15° C./humidity: 10% RH, L/L), 20 sheets of a solid white image was continuously printed out, and then a halftone image was printed out, and the occurrence of the density unevenness (mist-like density difference, or belt-like density difference traveling in the direction of the progression of image formation) was visually observed.

A: In the halftone image, definitely no density difference is identified.
B: In the halftone image, slight density difference is identified.
C: In part of the halftone image, density difference is somewhat identified.
D: In the halftone image, density difference is definitely identified.

(6) Initial Stage Image Density

After the above-described halftone image evaluation, a solid black image was printed out, and the density of the printed image was measured to evaluate the initial stage image density. The image density was measured with the MacBeth reflection densitometer, RD918 (trade name, manufactured by MacBeth Co., Ltd.), as the relative density in relation to the image corresponding to the white background portion of having an original image density of 0.00.

(7) Endurance Image Density

In an environment of a temperature of 32° C. and a humidity of 85% RH, the endurance image density was evaluated by measuring the density of the solid black image obtained after a 6,000-sheet printing. The image density was measured with the MacBeth reflection densitometer, RD918 (trade name, manufactured by MacBeth Co., Ltd.), as the relative density in relation to the image corresponding to the white background portion of having an original image density of 0.00.

(8) Endurance Fog

The whiteness degree of the white background portion of a printed-out image and the whiteness degree of a transfer paper were measured with the Reflectmeter Model TC-6DS (manufactured by Tokyo Denshoku Co., Ltd.), and the fog density (%) was derived from the whiteness degree difference between both of these two whiteness degrees. The filter used was an Amberlite filter.

Examples 63 to 67 and Comparative Examples 14 to 17

The developing sleeves S-76 to S-83 were prepared in the same manner as in Example 62 with the formulations listed in Table 7, and were evaluated. These sleeves were prepared with the appropriately regulated solid content concentrations of the coating materials for the resin layer. The results thus obtained are shown in Table 8.

As can be seen from the above-described results, similarly to the cases of Examples 2 to 33, by designing at least one of $R_3$, $R_4$ and $R_5$ shown in formula (1) to be a group having 4 or more carbon atoms, sufficient image densities were able to be attained and rank c or higher evaluations were able to be attained for the other image evaluation items. On the other hand, in Comparative Example 15 in which the number of carbon atoms in the long-chain alkyl group exceeded 18, the compatibility with the thermosetting resin was degraded, and the distribution of the triboelectric charge amount was made nonuniform. Consequently, the halftone uniformity in the initial stage and the initial stage image density in the L/L environment were degraded.

With respect to the graphitized carbon black, it has been found that with the decrease of the graphite (002) lattice spacing, the lubricity and the dispersibility in the solvent are improved. In Comparative Example 16 in which a graphitized carbon black having a graphite (002) lattice spacing of 0.3460 nm was used, the lubricity and the dispersibility were insufficient, and the intended initial stage halftone uniformity and the intended initial stage image density were not obtained. With respect to the acid carbon black, when the pH was 5.0 or less, the dispersibility of the conductive agent in the coating material was improved, and developer carrying members in which the conductive agent was uniformly distributed were obtained. In Comparative Example 17 in which a carbon black having a pH of 6.5 was used, the dispersibility of the conductive agent was insufficient, and no satisfactory results were obtained for the evaluation items (5) to (8).

TABLE 1

| Additive resin | Unit (1) Monomer Name | parts | Quaternarizing agent Name | parts | Unit (4) Name | parts | Unit (4) Name | parts |
|---|---|---|---|---|---|---|---|---|
| B-1 | Dimethylaminoethyl methacrylate | 36.5 | Lauryl bromide | 63.5 | | | | |
| B-2 | Dimethylaminomethyl methacrylate | 60.6 | Butyl chloride | 39.4 | | | | |
| B-3 | Dioctadecylaminomethyl methacrylate | 81.9 | Butyl bromide | 18.1 | | | | |
| B-4 | Dimethylaminomethyl methacrylate | 30.0 | Stearyl bromide | 70.0 | | | | |
| B-5 | Dioctadecylaminomethyl methacrylate | 65.0 | Stearyl bromide | 35.0 | | | | |
| B-6 | Dimethylaminobutyl methacrylate | 76.4 | Butyl iodide | 23.6 | | | | |
| B-7 | Dioctadecylaminobutyl methacrylate | 82.8 | Butyl bromide | 17.2 | | | | |
| B-8 | Dimethylaminobutyl methacrylate | 35.7 | Stearyl bromide | 64.3 | | | | |
| B-9 | Dioctadecylaminobutyl methacrylate | 66.5 | Stearyl bromide | 33.5 | | | | |
| B-10 | Dimethylaminoethyl acrylate | 34.1 | Lauryl bromide | 65.9 | | | | |
| B-11 | Dimethylaminoethyl methacrylate | 36.5 | Lauryl bromide | 63.5 | | | | |
| B-12 | N-Dimethylaminoethyl-2-propeneamide | 51.6 | Butyl bromide | 48.4 | | | | |
| B-13 | N-Dioctadecylaminobutyl-2-propeneamide | 65.1 | Stearyl bromide | 34.9 | | | | |
| B-14 | 4-(Dimethylamino)methylstyrene | 32.6 | Stearyl bromide | 67.4 | | | | |
| B-15 | 4-(Dioctadecylamino)butylstyrene | 83.2 | Butyl bromide | 16.8 | | | | |
| B-16 | Dimethylaminoethyl methacrylate | 36.5 | Lauryl bromide | 63.5 | Octyl acrylate | 5.2 | | |
| B-17 | Dimethylaminoethyl methacrylate | 36.5 | Lauryl bromide | 63.5 | Octyl methacrylate | 50.5 | | |
| B-18 | Dimethylaminoethyl methacrylate | 36.5 | Lauryl bromide | 63.5 | Octadecyl methacrylate | 9.6 | | |
| B-19 | Dimethylaminoethyl methacrylate | 36.5 | Lauryl bromide | 63.5 | Octadecyl methacrylate | 86.2 | | |
| B-20 | Dimethylaminoethyl methacrylate | 36.5 | Lauryl bromide | 63.5 | Butyl methacrylate | 15.5 | | |
| B-21 | Dimethylaminoethyl methacrylate | 36.5 | Lauryl bromide | 63.5 | Docosyl methacrylate | 43.1 | | |
| B-22 | Dimethylaminoethyl methacrylate | 36.5 | Lauryl bromide | 63.5 | Octyl methacrylate | 117.9 | | |
| B-23 | Dimethylaminoethyl methacrylate | 36.5 | Lauryl bromide | 63.5 | Octyl methacrylate | 21.6 | | |
| B-24 | Dimethylaminoethyl methacrylate | 51.1 | Butyl bromide | 48.9 | Octyl methacrylate | 30.3 | | |

TABLE 1-continued

| Additive resin | Monomer Name | parts | Quaternarizing agent Name | parts | Unit (4) Name | parts | Unit (4) Name | parts |
|---|---|---|---|---|---|---|---|---|
| B-25 | Dimethylaminoethyl methacrylate | 41.6 | Octyl bromide | 58.4 | Octyl methacrylate | 24.7 | | |
| B-26 | Dimethylaminoethyl methacrylate | 34.4 | Myristyl bromide | 65.6 | Octyl methacrylate | 20.4 | | |
| B-27 | Dimethylaminoethyl methacrylate | 30.0 | Stearyl bromide | 70.0 | Octyl methacrylate | 17.8 | | |
| B-28 | N-Dimethylaminoethyl-2-propeneamide | 51.6 | Butyl bromide | 48.4 | Octyl methacrylate | 30.0 | | |
| B-29 | 4-(Dioctadecylamino)butylstyrerne | 83.2 | Butyl bromide | 16.8 | Octadecyl methacrylate | 17.8 | | |
| B-30 | Dimethylaminoethyl methacrylate | 36.5 | Lauryl bromide | 63.5 | Octadecyl methacrylate | 10.8 | Tridecyl methacrylate | 8.5 |
| b-1 | Dimethylaminoethyl methacrylate | 59.0 | Ethyl bromide | 41.0 | | | | |
| b-2 | Diethylaminoethyl methacrylate | 30.5 | Docosyl bromide | 69.5 | | | | |
| b-3 | N-Dimethylaminoethyl-2-propeneamide | 57.3 | Ethyl bromide | 42.7 | | | | |
| b-4 | N-Dioctadecylaminopentyl-2-propeneamide | 65.6 | Stearyl bromide | 34.4 | | | | |
| b-5 | 4-(Dioctadecylamino)butylstyrerne | 63.6 | Docosyl bromide | 36.4 | | | | |

TABLE 2

Structure of additive resins

| Additive resin | Quaternary ammonium base-containing unit | | | | | | Ester unit | | | Ester unit | | |
|---|---|---|---|---|---|---|---|---|---|---|---|---|
| | X | R1 | R2 | R3 | R4, R5 | Anion species | Unit ratio | R6 | R7 | Unit ratio | R6 | R7 | Unit ratio |
| B-1 | —COO— | 1 | 2 | 12 | 1 | Br | 1 | — | — | — | — | — |
| B-2 | —COO— | 1 | 1 | 4 | 1 | Cl | 1 | | | | | |
| B-3 | —COO— | 1 | 1 | 4 | 18 | Br | 1 | | | | | |
| B-4 | —COO— | 1 | 1 | 18 | 1 | Br | 1 | | | | | |
| B-5 | —COO— | 1 | 1 | 18 | 18 | Br | 1 | | | | | |
| B-6 | —COO— | 1 | 4 | 4 | 1 | I | 1 | | | | | |
| B-7 | —COO— | 1 | 4 | 4 | 18 | Br | 1 | | | | | |
| B-8 | —COO— | 1 | 4 | 18 | 1 | Br | 1 | | | | | |
| B-9 | —COO— | 1 | 4 | 18 | 18 | Br | 1 | | | | | |
| B-10 | —COO— | 0 | 2 | 12 | 1 | Br | 1 | | | | | |
| B-11 | —COO— | 1 | 2 | 12 | 1 | p-TSA | 1 | | | | | |
| B-12 | —CONH— | 0 | 1 | 4 | 1 | Br | 1 | | | | | |
| B-13 | —CONH— | 0 | 4 | 18 | 18 | Br | 1 | | | | | |
| B-14 | —C6H4— | 0 | 1 | 18 | 1 | Br | 1 | | | | | |
| B-15 | —C6H4— | 0 | 4 | 4 | 18 | Br | 1 | | | | | |
| B-16 | —COO— | 1 | 2 | 12 | 1 | Br | 0.9 | 0 | 8 | 0.1 | | |
| B-17 | —COO— | 1 | 2 | 12 | 1 | Br | 0.5 | 1 | 8 | 0.5 | | |
| B-18 | —COO— | 1 | 2 | 12 | 1 | Br | 0.9 | 1 | 18 | 0.1 | | |
| B-19 | —COO— | 1 | 2 | 12 | 1 | Br | 0.5 | 1 | 18 | 0.5 | | |
| B-20 | —COO— | 1 | 2 | 12 | 1 | Br | 0.7 | 1 | 4 | 0.3 | | |
| B-21 | —COO— | 1 | 2 | 12 | 1 | Br | 0.7 | 1 | 22 | 0.3 | | |
| B-22 | —COO— | 1 | 2 | 12 | 1 | Br | 0.3 | 1 | 8 | 0.7 | | |
| B-23 | —COO— | 1 | 2 | 12 | 4 | Br | 0.7 | 1 | 8 | 0.3 | | |
| B-24 | —COO— | 1 | 2 | 4 | 1 | Br | 0.7 | 1 | 8 | 0.3 | | |
| B-25 | —COO— | 1 | 2 | 8 | 1 | Br | 0.7 | 1 | 8 | 0.3 | | |
| B-26 | —COO— | 1 | 2 | 14 | 1 | Br | 0.7 | 1 | 8 | 0.3 | | |
| B-27 | —COO— | 1 | 2 | 18 | 1 | Br | 0.7 | 1 | 8 | 0.3 | | |
| B-28 | —CONH— | 0 | 1 | 4 | 1 | Br | 0.7 | 1 | 8 | 0.3 | | |
| B-29 | —C6H4— | 0 | 4 | 4 | 18 | Br | 0.7 | 1 | 18 | 0.3 | | |
| B-30 | —COO— | 1 | 2 | 12 | 1 | Br | 0.8 | 1 | 18 | 0.1 | 1 | 12 | 0.1 |
| b-1 | —COO— | 1 | 2 | 2 | 1 | Br | 1 | — | — | — | 1 | | |
| b-2 | —COO— | 1 | 2 | 22 | 2 | Br | 1 | | | | | |
| b-3 | —CONH— | 0 | 1 | 2 | 1 | Br | 1 | | | | | |
| b-4 | —CONH— | 0 | 5 | 18 | 18 | Br | 1 | | | | | |
| b-5 | —C6H4— | 0 | 1 | 22 | 1 | Br | 1 | | | | | | p-TSA: p-Toluenesulfonic acid

TABLE 3

List of graphitized carbon blacks

| Graphitized CB | Trade name | Lattice spacing/ nm | Particle size/ nm |
|---|---|---|---|
| G-1 | Toka Black #5500 | 0.3410 | 25 |
| G-2 | Toka Black #5500 | 0.3370 | 25 |
| G-3 | Toka Black #5500 | 0.3450 | 25 |
| G-4 | Toka Black #7050 | 0.3370 | 65 |

TABLE 3-continued

List of graphitized carbon blacks

| Graphitized CB | Trade name | Lattice spacing/ nm | Particle size/ nm |
|---|---|---|---|
| G-5 | Toka Black #7050 | 0.3450 | 65 |
| G-6 | Toka Black #5500 | 0.3460 | 25 |
| G-7 | Toka Black #7050 | 0.3460 | 65 |

TABLE 4

List of acid carbon blacks and neutral carbon black

| Acid CB | Trade name | pH | Particle size/ nm |
|---|---|---|---|
| A-1 | Specialblack4 | 3.0 | 25 |
| A-2 | Specialblack6 | 2.5 | 17 |
| A-3 | Toka Black #4300 | 5.0 | 55 |
| A-4 | MA77 | 2.5 | 23 |
| A-5 | S-170 | 4.5 | 17 |
| A-6 | Specialblack 100 | 3.5 | 50 |
| a-1 | #2600 | 6.5 | 13 |

TABLE 5

Formulations of developer carrying members

| | Developer carrying member | Binder resin Type | parts | Alcohol Type | Additive resin Type | parts | Graphitized CB Type | parts | Acid CB Type | parts |
|---|---|---|---|---|---|---|---|---|---|---|
| Example 1 | S-1 | Binder resin 1 | 100 | Ethanol | B-1 | 10 | G-1 | 25 | A-1 | 25 |
| Example 2 | S-2 | Binder resin 1 | 100 | Ethanol | B-2 | 10 | G-2 | 25 | A-2 | 25 |
| Example 3 | S-3 | Binder resin 1 | 100 | Ethanol | B-3 | 10 | G-2 | 25 | A-2 | 25 |
| Example 4 | S-4 | Binder resin 1 | 100 | Ethanol | B-4 | 10 | G-2 | 25 | A-2 | 25 |
| Example 5 | S-5 | Binder resin 1 | 100 | Ethanol | B-5 | 10 | G-2 | 25 | A-2 | 25 |
| Example 6 | S-6 | Binder resin 1 | 100 | Normal butanol | B-6 | 10 | G-2 | 25 | A-2 | 25 |
| Example 7 | S-7 | Binder resin 1 | 100 | Normal butanol | B-7 | 10 | G-2 | 25 | A-2 | 25 |
| Example 8 | S-8 | Binder resin 1 | 100 | Normal butanol | B-8 | 10 | G-2 | 25 | A-2 | 25 |
| Example 9 | S-9 | Binder resin 1 | 100 | Normal butanol | B-9 | 10 | G-2 | 25 | A-2 | 25 |
| Example 10 | S-10 | Binder resin 1 | 100 | Methanol | B-2 | 10 | G-2 | 25 | A-3 | 25 |
| Example 11 | S-11 | Binder resin 1 | 100 | Methanol | B-3 | 10 | G-2 | 25 | A-3 | 25 |
| Example 12 | S-12 | Binder resin 1 | 100 | Methanol | B-4 | 10 | G-2 | 25 | A-3 | 25 |
| Example 13 | S-13 | Binder resin 1 | 100 | Methanol | B-5 | 10 | G-2 | 25 | A-3 | 25 |
| Example 14 | S-14 | Binder resin 1 | 100 | Isopropyl alcohol | B-6 | 10 | G-2 | 25 | A-3 | 25 |
| Example 15 | S-15 | Binder resin 1 | 100 | Isopropyl alcohol | B-7 | 10 | G-2 | 25 | A-3 | 25 |
| Example 16 | S-16 | Binder resin 1 | 100 | Isopropyl alcohol | B-8 | 10 | G-2 | 25 | A-3 | 25 |
| Example 17 | S-17 | Binder resin 1 | 100 | Isopropyl alcohol | B-9 | 10 | G-2 | 25 | A-3 | 25 |
| Example 18 | S-18 | Binder resin 1 | 100 | Isopropyl alcohol | B-2 | 10 | G-3 | 25 | A-2 | 25 |
| Example 19 | S-19 | Binder resin 1 | 100 | Isopropyl alcohol | B-3 | 10 | G-3 | 25 | A-2 | 25 |
| Example 20 | S-20 | Binder resin 1 | 100 | Isopropyl alcohol | B-4 | 10 | G-3 | 25 | A-2 | 25 |
| Example 21 | S-21 | Binder resin 1 | 100 | Isopropyl alcohol | B-5 | 10 | G-3 | 25 | A-2 | 25 |
| Example 22 | S-22 | Binder resin 1 | 100 | Methanol | B-6 | 10 | G-3 | 25 | A-2 | 25 |
| Example 23 | S-23 | Binder resin 1 | 100 | Methanol | B-7 | 10 | G-3 | 25 | A-2 | 25 |
| Example 24 | S-24 | Binder resin 1 | 100 | Methanol | B-8 | 10 | G-3 | 25 | A-2 | 25 |
| Example 25 | S-25 | Binder resin 1 | 100 | Methanol | B-9 | 10 | G-3 | 25 | A-2 | 25 |
| Example 26 | S-26 | Binder resin 1 | 100 | Normal butanol | B-2 | 10 | G-3 | 25 | A-3 | 25 |
| Example 27 | S-27 | Binder resin 1 | 100 | Normal butanol | B-3 | 10 | G-3 | 25 | A-3 | 25 |
| Example 28 | S-28 | Binder resin 1 | 100 | Normal butanol | B-4 | 10 | G-3 | 25 | A-3 | 25 |
| Example 29 | S-29 | Binder resin 1 | 100 | Normal butanol | B-5 | 10 | G-3 | 25 | A-3 | 25 |
| Example 30 | S-30 | Binder resin 1 | 100 | Ethanol | B-6 | 10 | G-3 | 25 | A-3 | 25 |
| Example 31 | S-31 | Binder resin 1 | 100 | Ethanol | B-7 | 10 | G-3 | 25 | A-3 | 25 |
| Example 32 | S-32 | Binder resin 1 | 100 | Ethanol | B-8 | 10 | G-3 | 25 | A-3 | 25 |
| Example 33 | S-33 | Binder resin 1 | 100 | Ethanol | B-9 | 10 | G-3 | 25 | A-3 | 25 |
| Example 34 | S-34 | Binder resin 1 | 100 | Ethanol | B-1 | 40 | G-1 | 25 | A-1 | 25 |
| Example 35 | S-35 | Binder resin 1 | 100 | Ethanol | B-2 | 3 | G-1 | 25 | A-1 | 25 |
| Example 36 | S-36 | Binder resin 2 | 100 | Ethanol | B-9 | 10 | G-3 | 25 | A-3 | 25 |
| Example 37 | S-37 | Binder resin 3 | 100 | Ethanol | B-9 | 10 | G-3 | 25 | A-3 | 25 |
| Example 38 | S-38 | Binder resin 1 | 100 | Ethanol | B-10 | 10 | G-1 | 25 | A-1 | 25 |
| Example 39 | S-39 | Binder resin 1 | 100 | Ethanol | B-11 | 10 | G-1 | 25 | A-1 | 25 |
| Example 40 | S-40 | Binder resin 1 | 100 | Ethanol | B-12 | 10 | G-3 | 25 | A-3 | 25 |
| Example 41 | S-41 | Binder resin 1 | 100 | Ethanol | B-13 | 10 | G-3 | 25 | A-3 | 25 |
| Example 42 | S-42 | Binder resin 1 | 100 | Ethanol | B-14 | 10 | G-3 | 25 | A-3 | 25 |
| Example 43 | S-43 | Binder resin 1 | 100 | Ethanol | B-15 | 10 | G-3 | 25 | A-3 | 25 |
| Example 44 | S-44 | Binder resin 1 | 100 | Ethanol | B-16 | 10 | G-1 | 25 | A-1 | 25 |
| Example 45 | S-45 | Binder resin 1 | 100 | Ethanol | B-17 | 10 | G-1 | 25 | A-1 | 25 |
| Example 46 | S-46 | Binder resin 1 | 100 | Ethanol | B-18 | 10 | G-1 | 25 | A-1 | 25 |
| Example 47 | S-47 | Binder resin 1 | 100 | Ethanol | B-19 | 10 | G-1 | 25 | A-1 | 25 |
| Example 48 | S-48 | Binder resin 1 | 100 | Ethanol | B-20 | 10 | G-1 | 25 | A-1 | 25 |
| Example 49 | S-49 | Binder resin 1 | 100 | Ethanol | B-21 | 10 | G-1 | 25 | A-1 | 25 |
| Example 50 | S-50 | Binder resin 1 | 100 | Ethanol | B-22 | 10 | G-1 | 25 | A-1 | 25 |
| Example 51 | S-51 | Binder resin 1 | 100 | Ethanol | B-23 | 10 | G-1 | 25 | A-1 | 25 |
| Example 52 | S-52 | Binder resin 1 | 100 | Ethanol | B-24 | 10 | G-1 | 25 | A-1 | 25 |
| Example 53 | S-53 | Binder resin 1 | 100 | Ethanol | B-25 | 10 | G-1 | 25 | A-1 | 25 |
| Example 54 | S-54 | Binder resin 1 | 100 | Ethanol | B-26 | 10 | G-1 | 25 | A-1 | 25 |
| Example 55 | S-55 | Binder resin 1 | 100 | Ethanol | B-27 | 10 | G-1 | 25 | A-1 | 25 |

TABLE 5-continued

Formulations of developer carrying members

| | Developer carrying member | Binder resin Type | parts | Alcohol Type | Additive resin Type | parts | Graphitized CB Type | parts | Acid CB Type | parts |
|---|---|---|---|---|---|---|---|---|---|---|
| Example 56 | S-56 | Binder resin 1 | 100 | Ethanol | B-28 | 10 | G-1 | 25 | A-1 | 25 |
| Example 57 | S-57 | Binder resin 1 | 100 | Ethanol | B-29 | 10 | G-1 | 25 | A-1 | 25 |
| Example 58 | S-58 | Binder resin 1 | 100 | Ethanol | B-30 | 10 | G-1 | 25 | A-1 | 25 |
| Example 59 | S-59 | Binder resin 1 | 100 | Ethanol | B-1 | 10 | G-4 | 25 | A-4 | 25 |
| Example 60 | S-60 | Binder resin 1 | 100 | Ethanol | B-1 | 10 | G-5 | 25 | A-5 | 25 |
| Example 61 | S-61 | Binder resin 1 | 100 | Ethanol | B-1 | 10 | G-6 | 25 | A-6 | 25 |
| Comparative Example 1 | S-62 | Binder resin 1 | 100 | Ethanol | b-1 | 10 | G-3 | 25 | A-3 | 25 |
| Comparative Example 2 | S-63 | Binder resin 1 | 100 | Ethanol | b-2 | 10 | G-3 | 25 | A-3 | 25 |
| Comparative Example 3 | S-64 | Binder resin 1 | 100 | Ethanol | B-9 | 10 | G-6 | 25 | A-3 | 25 |
| Comparative Example 4 | S-65 | Binder resin 1 | 100 | Ethanol | B-9 | 10 | G-7 | 65 | A-3 | 25 |
| Comparative Example 5 | S-66 | Binder resin 1 | 100 | Ethanol | B-9 | 10 | G-3 | 25 | a-1 | 25 |
| Comparative Example 6 | S-67 | Binder resin 1 | 100 | Toluene | B-9 | 10 | G-3 | 25 | A-3 | 25 |
| Comparative Example 7 | S-68 | Binder resin 4 | 100 | Ethanol | B-9 | 10 | G-3 | 25 | A-3 | 25 |
| Comparative Example 8 | S-69 | Binder resin 1 | 100 | Ethanol | | | G-3 | 25 | A-3 | 25 |
| Comparative Example 9 | S-70 | Binder resin 1 | 100 | Ethanol | B-9 | 10 | | | A-3 | 50 |
| Comparative Example 10 | S-71 | Binder resin 1 | 100 | Ethanol | B-9 | 10 | G-3 | 50 | | |
| Comparative Example 11 | S-72 | Binder resin 1 | 100 | Ethanol | b-3 | 10 | G-3 | 25 | A-3 | 25 |
| Comparative Example 12 | S-73 | Binder resin 1 | 100 | Ethanol | b-4 | 10 | G-3 | 25 | A-3 | 25 |
| Comparative Example 13 | S-74 | Binder resin 1 | 100 | Ethanol | b-5 | 10 | G-3 | 25 | A-3 | 25 |

TABLE 6-1

| | | Image evaluation items | | | | | | | |
|---|---|---|---|---|---|---|---|---|---|
| | | (1) | | (2) | | (3) (H/H) | | (3) (L/L) | (4) |
| | | | | After | | After | | After | After |
| | Developer carrying member | Initial stage | 10-Day leaving | Initial stage | 150,000-sheet printing | Initial stage | 150,000-sheet printing | Initial stage | 150,000-sheet printing | Initial stage | 150,000-sheet printing |
| Example 1 | S-1 | 1.48 | 1.45 | A | A | A | A | A | A | A |
| Example 2 | S-2 | 1.36 | 1.32 | A | A | A | B | A | A | A |
| Example 3 | S-3 | 1.47 | 1.43 | A | A | A | A | A | A | A |
| Example 4 | S-4 | 1.47 | 1.43 | A | A | A | A | A | A | A |
| Example 5 | S-5 | 1.49 | 1.45 | B | B | A | A | B | A | A |
| Example 6 | S-6 | 1.35 | 1.31 | A | A | A | B | A | A | A |
| Example 7 | S-7 | 1.47 | 1.43 | A | A | A | A | A | A | A |
| Example 8 | S-8 | 1.46 | 1.42 | A | A | A | A | A | A | A |
| Example 9 | S-9 | 1.48 | 1.45 | B | B | A | A | B | A | A |
| Example 10 | S-10 | 1.34 | 1.31 | A | A | A | B | A | A | A |
| Example 11 | S-11 | 1.47 | 1.42 | A | B | A | A | B | A | A |
| Example 12 | S-12 | 1.46 | 1.42 | A | A | A | A | A | A | A |
| Example 13 | S-13 | 1.48 | 1.44 | B | B | A | A | C | B | A |
| Example 14 | S-14 | 1.33 | 1.32 | A | A | A | B | A | A | A |
| Example 15 | S-15 | 1.46 | 1.42 | A | B | A | A | B | A | A |
| Example 16 | S-16 | 1.46 | 1.41 | A | A | A | A | A | A | A |
| Example 17 | S-17 | 1.47 | 1.44 | B | B | A | A | C | B | A |
| Example 18 | S-18 | 1.35 | 1.31 | A | A | A | B | A | A | B |
| Example 19 | S-19 | 1.47 | 1.42 | B | B | A | A | A | A | B |
| Example 20 | S-20 | 1.46 | 1.42 | A | A | A | A | A | A | B |
| Example 21 | S-21 | 1.48 | 1.44 | B | B | A | A | C | B | B |
| Example 22 | S-22 | 1.33 | 1.30 | A | A | A | B | A | A | B |
| Example 23 | S-23 | 1.46 | 1.42 | B | B | A | A | A | A | B |
| Example 24 | S-24 | 1.46 | 1.41 | A | A | A | A | A | A | B |
| Example 25 | S-25 | 1.48 | 1.44 | B | B | A | A | C | B | B |

TABLE 6-1-continued

|  | Developer carrying member | (1) Initial stage | 10-Day leaving | (2) Initial stage | (2) After 150,000-sheet printing | (3) (H/H) Initial stage | (3) (H/H) After 150,000-sheet printing | (3) (L/L) Initial stage | (3) (L/L) After 150,000-sheet printing | (4) After 150,000-sheet printing |
|---|---|---|---|---|---|---|---|---|---|---|
| Example 26 | S-26 | 1.34 | 1.30 | A | A | B | C | A | A | C |
| Example 27 | S-27 | 1.46 | 1.42 | B | C | A | A | B | A | C |
| Example 28 | S-28 | 1.45 | 1.39 | A | B | A | B | A | A | C |
| Example 29 | S-29 | 1.48 | 1.44 | C | C | A | A | C | C | C |
| Example 30 | S-30 | 1.33 | 1.30 | A | A | B | C | A | A | C |
| Example 31 | S-31 | 1.46 | 1.42 | B | C | A | B | B | A | C |
| Example 32 | S-32 | 1.45 | 1.39 | A | B | A | A | A | A | C |
| Example 33 | S-33 | 1.47 | 1.47 | C | C | B | B | C | C | C |
| Example 34 | S-34 | 1.48 | 1.47 | A | C | A | A | B | B | B |
| Example 35 | S-35 | 1.32 | 1.27 | A | A | A | C | A | A | A |
| Example 36 | S-36 | 1.47 | 1.37 | C | C | B | B | C | C | C |
| Example 37 | S-37 | 1.47 | 1.36 | C | C | B | B | C | C | C |
| Example 38 | S-38 | 1.47 | 1.43 | A | A | A | A | A | A | A |
| Example 39 | S-39 | 1.48 | 1.45 | A | A | B | A | A | A | A |
| Example 40 | S-40 | 1.34 | 1.30 | A | A | B | C | A | A | C |
| Example 41 | S-41 | 1.47 | 1.47 | C | C | B | B | C | C | C |
| Example 42 | S-42 | 1.45 | 1.39 | A | B | A | B | B | A | C |
| Example 43 | S-43 | 1.46 | 1.42 | B | C | A | B | B | B | C |
| Example 44 | S-44 | 1.42 | 1.38 | A | A | A | A | A | A | A |
| Example 45 | S-45 | 1.41 | 1.35 | A | A | B | B | B | A | A |
| Example 46 | S-46 | 1.45 | 1.42 | A | A | A | A | A | A | A |
| Example 47 | S-47 | 1.42 | 1.37 | A | A | A | B | B | A | A |
| Example 48 | S-48 | 1.39 | 1.31 | B | C | B | C | B | B | C |
| Example 49 | S-49 | 1.41 | 1.33 | B | C | A | B | B | B | C |
| Example 50 | S-50 | 1.38 | 1.29 | A | A | A | A | A | A | A |
| Example 51 | S-51 | 1.44 | 1.41 | A | A | A | A | A | A | A |
| Example 52 | S-52 | 1.37 | 1.29 | A | B | A | B | A | A | A |
| Example 53 | S-53 | 1.45 | 1.42 | A | A | A | A | A | A | A |
| Example 54 | S-54 | 1.46 | 1.43 | A | A | A | A | A | A | A |
| Example 55 | S-55 | 1.46 | 1.44 | B | B | A | B | B | B | A |
| Example 56 | S-56 | 1.37 | 1.29 | A | B | A | B | A | A | A |
| Example 57 | S-57 | 1.46 | 1.44 | B | C | A | B | B | B | B |
| Example 58 | S-58 | 1.45 | 1.42 | A | A | A | A | A | A | A |
| Example 59 | S-59 | 1.48 | 1.45 | A | A | A | A | A | A | A |
| Example 60 | S-60 | 1.47 | 1.44 | A | B | A | A | A | A | A |
| Example 61 | S-61 | 1.48 | 1.45 | A | B | A | A | A | A | B |
| Comparative Example 1 | S-62 | 1.25 | 1.17 | A | B | B | D | A | A | C |
| Comparative Example 2 | S-63 | 1.44 | 1.38 | C | D | C | D | D | C | C |
| Comparative Example 3 | S-64 | 1.43 | 1.37 | C | D | C | C | D | C | D |
| Comparative Example 4 | S-65 | 1.42 | 1.37 | C | D | C | C | D | C | D |
| Comparative Example 5 | S-66 | 1.42 | 1.37 | D | D | D | C | D | D | D |
| Comparative Example 6 | S-67 | 1.28 | 1.16 | C | C | B | C | D | C | D |
| Comparative Example 7 | S-68 | 1.33 | 1.17 | C | D | B | C | C | C | D |
| Comparative Example 8 | S-69 | 1.21 | 1.08 | A | A | C | D | A | A | B |
| Comparative Example 9 | S-70 | 1.40 | 1.20 | C | D | C | D | D | D | D |
| Comparative Example 10 | S-71 | 1.40 | 1.19 | D | D | D | D | D | D | D |
| Comparative Example 11 | S-72 | 1.25 | 1.17 | A | B | B | D | A | A | C |
| Comparative Example 12 | S-73 | 1.42 | 1.38 | C | D | C | D | D | D | C |
| Comparative Example 13 | S-74 | 1.44 | 1.38 | C | D | C | D | D | C | C |

TABLE 7

Formulations of developer carrying members

| | Developer carrying member | Binder resin Type | parts | Alcohol Type | Additive resin Type | parts | Graphitized CB Type | parts | Acid CB Type | parts |
|---|---|---|---|---|---|---|---|---|---|---|
| Example 62 | S-75 | Binder resin 1 | 100 | Ethanol | B-1 | 10 | G-1 | 20 | A-1 | 20 |
| Example 63 | S-76 | Binder resin 1 | 100 | Ethanol | B-2 | 10 | G-3 | 20 | A-3 | 20 |
| Example 64 | S-76 | Binder resin 1 | 100 | Ethanol | B-2 | 10 | G-3 | 20 | A-6 | 20 |
| Example 65 | S-77 | Binder resin 1 | 100 | Ethanol | B-3 | 10 | G-2 | 20 | A-2 | 20 |
| Example 66 | S-78 | Binder resin 1 | 100 | Ethanol | B-4 | 10 | G-2 | 20 | A-2 | 20 |
| Example 67 | S-79 | Binder resin 1 | 100 | Ethanol | B-5 | 10 | G-3 | 20 | A-3 | 20 |
| Comparative Example 14 | S-80 | Binder resin 1 | 100 | Ethanol | b-1 | 10 | G-3 | 20 | A-3 | 20 |
| Comparative Example 15 | S-81 | Binder resin 1 | 100 | Ethanol | b-2 | 10 | G-3 | 20 | A-3 | 20 |
| Comparative Example 16 | S-82 | Binder resin 1 | 100 | Ethanol | B-9 | 10 | G-7 | 20 | A-3 | 20 |
| Comparative Example 17 | S-83 | Binder resin 1 | 100 | Ethanol | B-9 | 10 | G-3 | 20 | a-1 | 20 |

TABLE 8

Evaluation results

| | Developer carrying member | Image evaluation items | | | |
|---|---|---|---|---|---|
| | | Initial stage evaluation (L/L) | | Endurance evaluation (H/H) | |
| | | (5) | (6) | (7) | (8) |
| Example 62 | S-75 | A | 1.52 | 1.46 | 0.2 |
| Example 63 | S-76 | B | 1.44 | 1.25 | 0.8 |
| Example 64 | S-76 | A | 1.46 | 1.30 | 0.7 |
| Example 65 | S-77 | A | 1.44 | 1.45 | 0.3 |
| Example 66 | S-78 | A | 1.45 | 1.43 | 0.3 |
| Example 67 | S-79 | C | 1.39 | 1.41 | 0.5 |
| Comparative Example 14 | S-80 | C | 1.38 | 1.18 | 2.1 |
| Comparative Example 15 | S-81 | D | 1.15 | 1.32 | 1.4 |
| Comparative Example 16 | S-82 | D | 1.18 | 1.30 | 1.7 |
| Comparative Example 17 | S-83 | D | 1.16 | 1.30 | 2.4 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-099887, filed Apr. 23, 2010, which is hereby incorporated by reference herein in its entirety.

What is claimed is:

1. A developer carrying member comprising a substrate and a resin layer formed thereon,
   wherein the resin layer is obtained by thermally curing a coating material composition including the following (A) to (E):
   (A) a thermosetting resin as a binder resin
   (B) an alcohol having 1 to 4 carbon atoms as a solvent,
   (C) a resin having a unit represented by the following formula (1)
   (D) a graphitized carbon black having a graphite (002) lattice spacing of 0.3370 nm or more and 0.3450 nm or less as measured by X-ray diffraction
   (E) an acidic carbon black having a pH of 5.0 or less

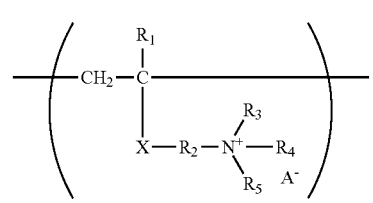

(1)

Wherein, in the formula (1),
   $R_1$ represents a hydrogen atom or a methyl group;
   $R_2$ represents an alkylene group having 1 to 4 carbon atoms;
   one or two or more groups selected from the group consisting of $R_3$, $R_4$ and $R_5$ each represents an alkyl group having 4 to 18 carbon atoms, and each of the rest represents an alkyl group having 1 to 3 carbon atoms;
   X represents —COO—, —CONH— or —$C_6H_4$—; and
   $A^-$ represents an anion.

2. The developer carrying member according to claim 1, wherein:
   $R_1$ is a methyl group,
   $R_2$ is a methylene group or an ethylene group,
   one or two or more selected from the group consisting of $R_3$, $R_4$ and $R_5$ are each any one selected from the group consisting of an octyl group, a nonyl group, a decyl group, an undecyl group, a dodecyl group, a tridecyl group and a tetradecyl group;
   the group or the groups of $R_3$, $R_4$ and $R_5$ not being an octyl group, a nonyl group, a decyl group, an undecyl group, a dodecyl group, a tridecyl group and a tetradecyl group is or are each any one selected from the group consisting of a methyl group, an ethyl group and a propyl group; and
   $A^-$ is an anion containing a sulfur atom or a halogen atom.

3. A developing apparatus comprising:
   a developer comprising toner particles,
   a container containing the developer, and
   a developer carrying member for carrying and conveying the developer contained in the container,
   wherein the developer carrying member is the developer carrying member according to claim 1.

* * * * *